United States Patent
Asaoka et al.

(10) Patent No.: US 11,706,096 B2
(45) Date of Patent: Jul. 18, 2023

(54) INFORMATION PROCESSING METHOD, COMPUTER-READABLE RECORDING MEDIUM STORING INFORMATION PROCESSING PROGRAM, INFORMATION PROCESSING APPARATUS, AND INFORMATION PROCESSING SYSTEM

(71) Applicant: FUJITSU LIMITED, Kawasaki (JP)

(72) Inventors: Masahiro Asaoka, Kawasaki (JP); Takeshi Yasuie, Kawasaki (JP); Reiko Kondo, Yamato (JP); Kazuhiro Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/675,327

(22) Filed: Feb. 18, 2022

(65) Prior Publication Data
US 2022/0173977 A1    Jun. 2, 2022

Related U.S. Application Data

(63) Continuation of application No. PCT/JP2019/041159, filed on Oct. 18, 2019.

(51) Int. Cl.
*G06F 15/173* (2006.01)
*H04L 41/12* (2022.01)

(52) U.S. Cl.
CPC .................. *H04L 41/12* (2013.01)

(58) Field of Classification Search
CPC .................................................. H04L 41/12
USPC ........................................ 709/201, 223, 200
See application file for complete search history.

(56) References Cited

U.S. PATENT DOCUMENTS

| | | | | |
|---|---|---|---|---|
| 8,484,355 B1 * | 7/2013 | Lochhead | .............. | G06F 9/5077 709/222 |
| 2006/0190768 A1 | 8/2006 | Kawase | | |
| 2012/0297379 A1 * | 11/2012 | Anderson | ........... | G06F 9/45558 718/1 |
| 2013/0054426 A1 * | 2/2013 | Rowland | ............... | G06F 9/5072 718/1 |
| 2013/0227097 A1 | 8/2013 | Yasuda et al. | | |

(Continued)

FOREIGN PATENT DOCUMENTS

| | | |
|---|---|---|
| EP | 3 240 231 A1 | 11/2017 |
| JP | 2011-243001 A | 12/2011 |

(Continued)

OTHER PUBLICATIONS

International Search Report dated Dec. 24, 2019, issued in counterpart International Application No. PCT/JP2019/041159 (1 page).

*Primary Examiner* — Liang Che A Wang
(74) *Attorney, Agent, or Firm* — WHDA, LLP

(57) ABSTRACT

An information processing method executed by a computer includes: specifying one or a plurality of first physical resources on which virtual resources used by a first user operate; specifying a device connected to the first physical resource and one or a plurality of second physical resources different from the first physical resource, which is connected to the device and on which virtual resources used by a user other than the first user operate; and outputting information that indicates the first physical resource and information that indicates the second physical resource.

9 Claims, 40 Drawing Sheets

(56) References Cited

U.S. PATENT DOCUMENTS

2015/0085642 A1* 3/2015 Sonoda ............... H04L 41/0654
                                                        370/225
2016/0212068 A1    7/2016 Sato
2017/0372518 A1* 12/2017 Rehmeyer ............ G03H 1/2249

FOREIGN PATENT DOCUMENTS

| JP | 2012-65015 A   | 3/2012 |
| JP | 2016-134721 A  | 7/2016 |
| WO | 2005/006190 A1 | 1/2005 |
| WO | 2014/006692 A1 | 1/2014 |
| WO | 2016/103421 A1 | 6/2016 |

* cited by examiner

FIG. 5

| TENANT | VIRTUAL MACHINE |
|--------|-----------------|
| A | A_DB01 |
| A | A_AP01 |
| A | A_WB01 |
| A | A_WB02 |
| B | B_DB01 |
| B | B_AP01 |
| B | B_WB01 |

FIG. 6

| TENANT | VOLUME |
|---|---|
| A | vl001_01 |
| A | vl001_02 |
| A | vl002_01 |
| A | vl002_02 |
| A | vl002_03 |
| B | vl003_01 |
| B | vl003_02 |
| B | vl004_01 |
| B | vl004_02 |

FIG. 7

| VIRTUAL MACHINE | PHYSICAL SERVER |
|---|---|
| A_DB01 | server_001 |
| A_AP01 | server_002 |
| A_WB01 | server_002 |
| A_WB02 | server_003 |
| B_DB01 | server_003 |
| B_AP01 | server_004 |
| B_WB01 | server_005 |

FIG. 8

| VOLUME | PHYSICAL STORAGE |
|---|---|
| vl001_01 | strage_001 |
| vl001_02 | strage_001 |
| vl002_01 | strage_002 |
| vl002_02 | strage_002 |
| vl002_03 | strage_002 |
| vl003_01 | strage_003 |
| vl003_02 | strage_003 |
| vl004_01 | strage_004 |
| vl004_02 | strage_004 |

FIG. 9

| PHYSICAL SERVER | RACK |
|---|---|
| server_001 | rack_x |
| server_002 | rack_x |
| server_003 | rack_x |
| server_004 | rack_x |
| server_005 | rack_y |

FIG. 10

| PHYSICAL STORAGE | RACK |
|---|---|
| storage_001 | rack_x |
| storage_002 | rack_x |
| storage_003 | rack_x |
| storage_004 | rack_y |

FIG. 11

| PHYSICAL SWITCH | RACK |
|---|---|
| psw_001 | rack_x |
| psw_002 | rack_x |
| psw_003 | rack_y |
| psw_004 | rack_z |
| psw_005 | rack_z |
| psw_006 | rack_z |
| psw_007 | rack_z |

FIG. 12

| PHYSICAL SERVER | PHYSICAL SWITCH |
|---|---|
| server_001 | psw_001 |
| server_002 | psw_001 |
| server_003 | psw_002 |
| server_004 | psw_002 |
| server_005 | psw_003 |

FIG. 13

| PHYSICAL STORAGE | PHYSICAL SWITCH |
|---|---|
| storage_001 | psw_001 |
| storage_002 | psw_002 |
| storage_003 | psw_002 |
| storage_004 | psw_003 |

FIG. 14

| PHYSICAL SWITCH | PHYSICAL SWITCH |
|---|---|
| psw_001 | psw_004 |
| psw_002 | psw_004 |
| psw_003 | psw_004 |
| psw_004 | psw_007 |
| psw_005 | psw_007 |
| psw_006 | psw_007 |

FIG. 15

| PHYSICAL RESOURCE | FAILURE |
|---|---|
| server_001 | ABSENT |
| server_002 | ABSENT |
| server_003 | ABSENT |
| server_004 | PRESENT |
| server_005 | ABSENT |
| storage_001 | ABSENT |
| storage_002 | ABSENT |
| storage_003 | ABSENT |
| storage_004 | ABSENT |
| psw_001 | ABSENT |
| psw_002 | ABSENT |
| psw_003 | ABSENT |
| psw_004 | ABSENT |
| psw_005 | ABSENT |
| psw_006 | ABSENT |
| psw_007 | ABSENT |

FIG. 25
<SYSTEM CONFIGURATION>
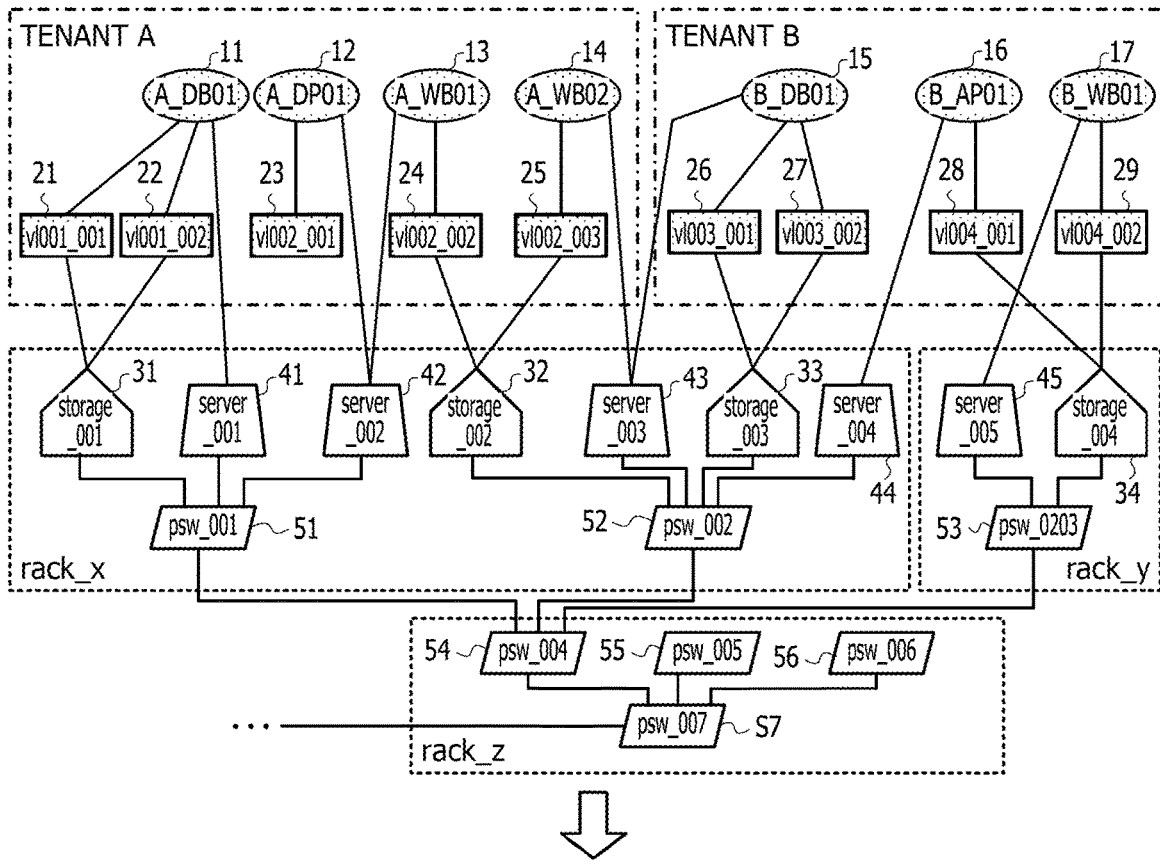
<DISPLAY EXAMPLE>
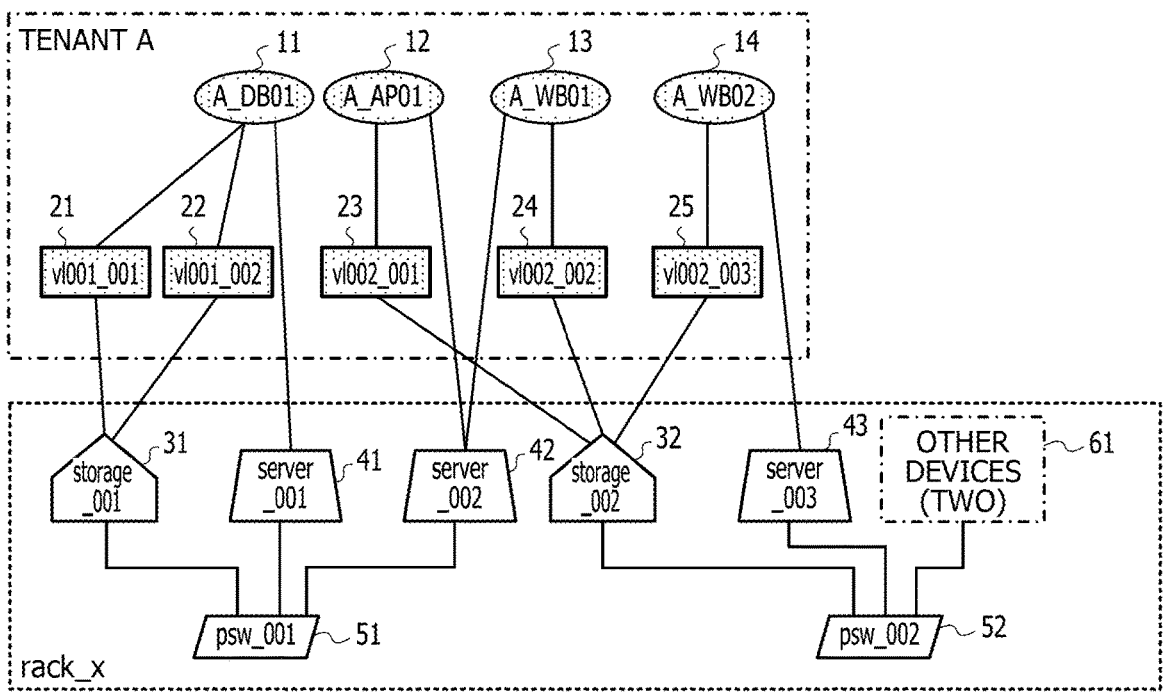

FIG. 28

| VIRTUAL MACHINE | PHYSICAL SERVER |
|---|---|
| B_DB01 | server_001 |
| B_AP01 | server_002 |
| B_WB01 | server_002 |

FIG. 29

| VOLUME | PHYSICAL STORAGE |
|---|---|
| vl001_01 | storage_001 |
| vl002_01 | storage_001 |
| vl001_01 | storage_002 |
| vl002_01 | storage_002 |
| vl001_01 | storage_003 |
| vl002_01 | storage_003 |

FIG. 30

| PHYSICAL SERVER | PHYSICAL SWITCH |
|---|---|
| server_001 | psw_003 |
| server_002 | psw_003 |

FIG. 31

| PHYSICAL STORAGE | PHYSICAL SWITCH |
|---|---|
| storage_001 | psw_001 |
| storage_002 | psw_001 |
| storage_003 | psw_001 |
| storage_001 | psw_002 |
| storage_002 | psw_002 |
| storage_003 | psw_002 |

FIG. 32

| PHYSICAL SWITCH | PHYSICAL SWITCH |
|---|---|
| psw_001 | psw_004 |
| psw_002 | psw_004 |
| psw_003 | psw_004 |

FIG. 33

| PHYSICAL RESOURCE | FAILURE |
|---|---|
| server_001 | ABSENT |
| server_002 | ABSENT |
| storage_001 | PRESENT |
| storage_002 | ABSENT |
| storage_003 | ABSENT |
| psw_001 | ABSENT |
| psw_002 | ABSENT |
| psw_003 | ABSENT |
| psw_004 | ABSENT |

FIG. 34

| PHYSICAL STORAGE | PHYSICAL SWITCH | VOLUME |
|---|---|---|
| storage_001 | psw_001 | vl001_01 |
| | psw_002 | vl002_01 |
| | psw_003 | |
| storage_002 | psw_001 | vl001_01 |
| | psw_002 | vl002_01 |
| | psw_003 | |
| storage_003 | psw_001 | vl001_01 |
| | psw_002 | vl002_01 |
| | psw_003 | |

FIG. 35

| PHYSICAL SWITCH | PHYSICAL STORAGE | PHYSICAL SERVER | PHYSICAL SWITCH |
|---|---|---|---|
| psw_001 | storage_001 | | psw_004 |
| | storage_002 | | |
| | storage_003 | | |
| psw_002 | storage_001 | | psw_004 |
| | storage_002 | | |
| | storage_003 | | |
| psw_003 | | server_001 | psw_004 |
| | | server_002 | |

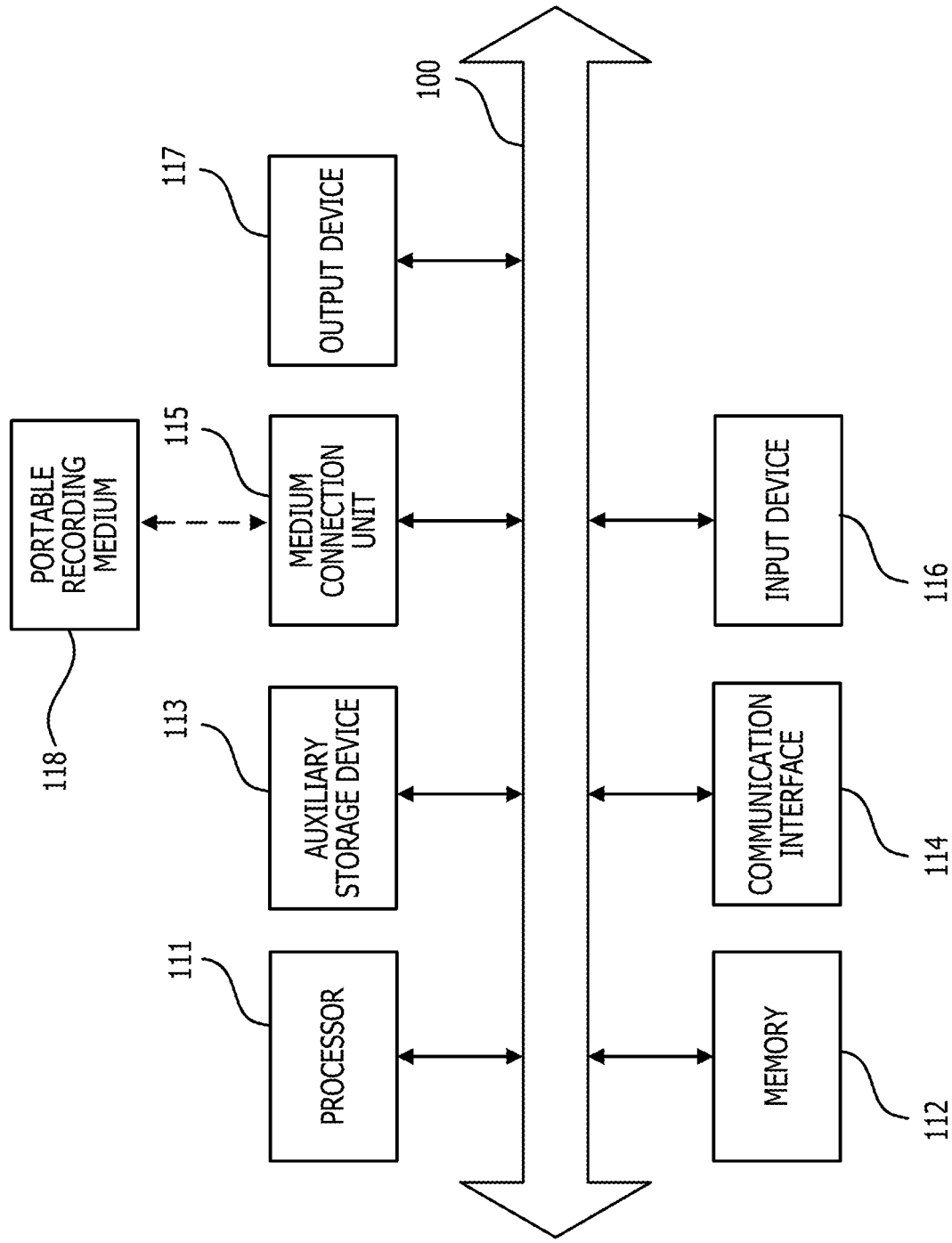

INFORMATION PROCESSING METHOD, COMPUTER-READABLE RECORDING MEDIUM STORING INFORMATION PROCESSING PROGRAM, INFORMATION PROCESSING APPARATUS, AND INFORMATION PROCESSING SYSTEM

CROSS-REFERENCE TO RELATED APPLICATION

This application is a continuation application of International Application PCT/JP2019/041159 filed on Oct. 18, 2019 and designated the U.S., the entire contents of which are incorporated herein by reference.

FIELD

The embodiments discussed herein are related to an information processing method, an information processing program, an information processing apparatus, and an information processing system.

BACKGROUND

A technology that uses virtual resources (virtual machines, virtual networks, volumes, and the like) operating on a cloud infrastructure for a customer system is used. In a case where the virtual resources are used for the customer system, the virtual resources are managed by an administrator of the customer system. On the other hand, physical resources (physical servers, physical storages, physical switches, and the like) in the cloud infrastructure are managed by an administrator of the cloud infrastructure.

International Publication Pamphlet. No. WO 2016/103421, International Publication Pamphlet No. WO 2005/006190, Japanese Laid-open Patent Publication No. 2012-65015, and Japanese Laid-open Patent Publication No. 2011-243001 are disclosed as related art.

SUMMARY

According to an aspect of the embodiments, an information processing method executed by a computer includes: specifying one or a plurality of first physical resources on which virtual resources used by a first user operate; specifying a device connected to the first physical resource and one or a plurality of second physical resources different from the first physical resource, which is connected to the device and on which virtual resources used by a user other than the first user operate; and outputting information that indicates the first physical resource and information that indicates the second physical resource.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of information indicating a relationship between a tenant and a virtual machine in the first embodiment;

FIG. 6 is a diagram illustrating an example of information indicating a relationship between the tenant and a volume in the first embodiment;

FIG. 7 is a diagram illustrating an example of information indicating a relationship between the virtual machine and a physical server in the first embodiment;

FIG. 8 is a diagram illustrating an example of information indicating a relationship between the volume and a physical storage in the first embodiment;

FIG. 9 is a diagram illustrating an example of information indicating a relationship between the physical server and a rack in the first embodiment;

FIG. 10 is a diagram illustrating an example of information indicating a relationship between the physical storage and the rack in the first embodiment;

FIG. 11 is a diagram illustrating an example of information indicating a relationship between a physical switch and the rack in the first embodiment;

FIG. 12 is a diagram illustrating an example of information indicating a relationship between the physical server and the physical switch in the first embodiment;

FIG. 13 is a diagram illustrating an example of information indicating a relationship between the physical storage and the physical switch in the first embodiment;

FIG. 14 is a diagram illustrating an example of information indicating a connection relationship between the physical switches in the first embodiment;

FIG. 15 is a diagram illustrating an example of information indicating presence or absence of a failure in physical resources in the first embodiment;

FIG. 25 is a diagram illustrating an outline of the processing of the first embodiment;

FIG. 28 is a diagram illustrating an example of information indicating a relationship between a virtual machine and a physical server in the second embodiment;

FIG. 29 is a diagram illustrating an example of information indicating a relationship between a volume and a physical storage in the second embodiment;

FIG. 30 is a diagram illustrating an example of information indicating a relationship between the physical server and a physical switch in the second embodiment;

FIG. 31 is a diagram illustrating an example of information indicating a relationship between the physical storage and the physical switch in the second embodiment;

FIG. 32 is a diagram illustrating an example of information indicating a connection relationship between the physical switches in the second embodiment;

FIG. 33 is a diagram illustrating an example of information indicating presence or absence of a failure in physical resources in the second embodiment;

FIG. 34 is a diagram illustrating an example of collection information of the physical storage in the second embodiment;

FIG. 35 is a diagram illustrating an example of collection information of the physical switch in the second embodiment;

FIG. 40 is a diagram illustrating an example of a hardware configuration of the information processing apparatus.

DESCRIPTION OF EMBODIMENTS

As a related technology, a technology has been proposed in which connection information and component icons for each component are used to generate and display, on the basis of cloud configuration information, a cloud configuration diagram.

Furthermore, as a related technology, a technology has been proposed in which an apparatus that has issued failure information is specified, and when information regarding the specified apparatus is received, the information regarding the specified apparatus is displayed.

Furthermore, as a related technology, a technology has been proposed in which a setting change item and a network device being a setting object are specified on the basis of a tenant identifier, a use case of a virtual server, and a segment condition, when changing a configuration of the virtual server.

Furthermore, as a related technology, a technology has been proposed in which an interrelation between hardware installed in an information technology (IT) system and an interrelation between hardware and software are analyzed and visually displayed on a display.

In a case where an abnormality such as a processing delay occurs in the virtual resources used in the customer system, it is determined whether a cause of the abnormality exists in the virtual resources or the physical resources in the cloud infrastructure. However, in a case where it is difficult to link the administrator of the customer system and the administrator of the cloud infrastructure, it takes time to specify the cause of the abnormality.

Furthermore, for example, it is conceivable that the administrator of the customer system refers to a configuration diagram of the cloud infrastructure in order to specify whether the cause of the abnormality is in the cloud infrastructure. However, it is difficult for the administrator of the customer system to specify a physical resource that affects operation of the virtual resources that the administrator of the customer system uses just by referring to the configuration diagram of the cloud infrastructure.

As one aspect, it is an object of embodiments to inform a user of a physical resource having a high degree of influence on operation of virtual resources.

First Embodiment

Figure 1:
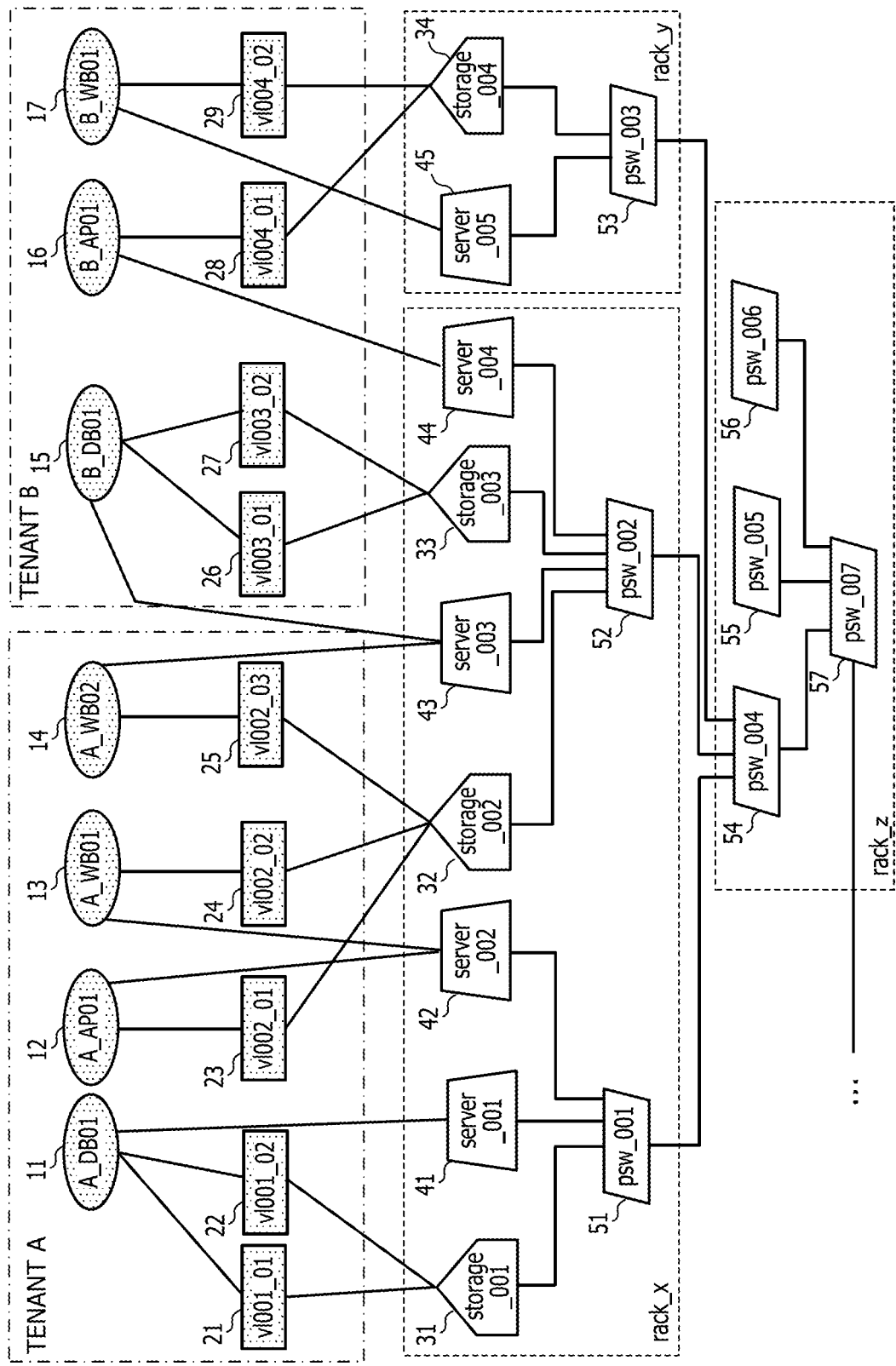
FIG. 1 is a diagram illustrating an example of an overall configuration of a system in a first embodiment.

Hereinafter, a first embodiment will be described with reference to the drawings. FIG. 1 is a diagram illustrating an example of an overall configuration of a system in the first embodiment. FIG. 1 includes virtual resources used by a plurality of tenants (tenant A and tenant B) and physical resources on which the virtual resources operate. The tenant is an example of a user (for example, a company or the like) who uses a virtual machine.

In FIG. 1, the virtual resources are indicated by a dot pattern. The virtual resources are, for example, virtual machines, virtual networks, volumes, and the like. The physical resources are, for example, physical servers, physical storage, physical switches, and the like. In FIG. 1, the virtual resources and the physical resources are indicated in different forms for each type.

In FIG. 1, A_DB01 (11), A_AP01 (12), A_WB01 (13), and A_WB02 (14) are the virtual machines used by the tenant A. B_DB01 (15), B_AP01 (16), and B_WB01 (17) are the virtual machines used by the tenant B.

Furthermore, vl001_01 (21), vl001_02 (22), vl002_01 (23), vl002_02 (24), and vl002_03 (25) are the volumes used by the tenant A. Furthermore, vl003_01 (26), vl003_02 (27), vl004_01 (28), and vl004_02 (29) are the volumes used by the tenant B.

Furthermore, storage_001 (31), storage_002 (32), storage_003 (33), and storage_004 (34) are the physical storages. The vl001_01 (21) and the vl001_02 (22) operate on the storage_001 (31). The vl002_01 (23), the vl002_02 (24), and the vl002_03 (25) operate on the storage_002 (32). The vl003_01 (26) and the vl003_02 (27) operate on the storage_003 (33). The vl004_01 (28) and the vl004_02 (29) operate on the storage_004 (34).

server_001 (41), server_002 (42), server_003 (43), server_004 (44), and server_005 (45) are the physical servers.

The A_DB01 (11) uses the vl001_01 (21) and the vl001_02 (22) and operates on the server_001 (41). The A_AP01 (12) uses the vl002_01 (23) and operates on the server_002 (42). The A_WB01 (13) uses the vl002_02 (24) and operates on the server_002 (42). The A_WB02 (14) uses the vl002_03 (25) and operates on the server_003 (43).

The B_DB01 (15) uses the vl003_01 (26) and the vl003_02 (27) and operates on the server_003 (43). The B_AP01 (16) uses the vl004_01 (28) and operates on the server_004 (44). The B_WB01 (17) uses the vl004_02 (29) and operates on the server_005 (45).

psw_001 (51), psw_002 (52), psw_003 (53), psw_004 (54), psw_005 (55), psw_006 (56), and psw_007 (57) are the physical switches. The storage_001 (31), the server_001 (41), and the server_002 (42) are connected to the psw_001 (51). The storage_002 (32), the storage_003 (33), the server_003 (43), and the server_004 (44) are connected to the psw_002 (52). The storage_004 (34) and the server_005 (45) are connected to the psw_003 (53). The psw_001 (51), the psw_002 (52), and the psw_003 (53) are connected to the psw_004 (54). The psw_004 (54), the psw_005 (55), and the psw_006 (56) are connected to the psw_007 (57).

rack_x, rack_y, and rack_z are racks that mount the physical resources. The rack_x mounts the storage_001 (31), the storage_002 (32), the storage_003 (33), the server_001 (41), the server_002 (42), the server_003 (43), and the server_004 (44). The rack_x also mounts the psw_001 (51) and the psw_002 (52). The rack_y mounts the storage_004 (34), the server_005 (45), and the psw_003 (53). The rack_z mounts the psw_004 (54), the psw_005 (55), the psw_006 (56), and the psw_007 (57).

Note that the system in the present embodiment may also include a configuration other than the configuration illustrated in FIG. 1.

For example, in a case where an abnormality such as a processing delay occurs in the virtual resources of the tenant A, a failure in the physical resources may be a cause of the abnormality. Thus, it is conceivable that an administrator of the tenant A specifies a physical resource having a high degree of influence on operation of the virtual resources of the tenant A by referring to a system configuration diagram as illustrated in FIG. 1. However, in a case where the number of physical resources included in a cloud infrastructure is large, it is difficult for the administrator to determine which physical resource has a high degree of influence on the operation of the virtual resources of the tenant. A even by referring to the system configuration diagram.

Figure 2:
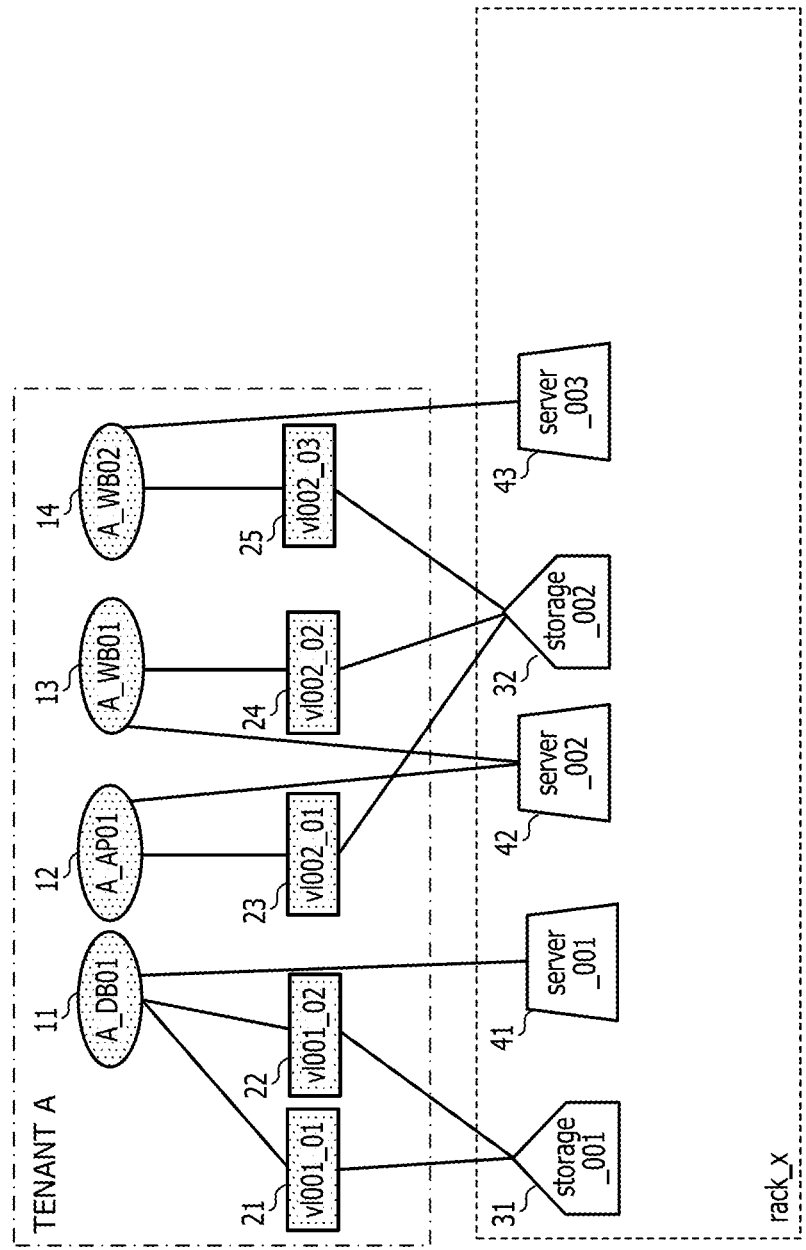
FIG. 2 is a diagram illustrating a first display example of a system configuration.

FIG. 2 is a diagram illustrating a first display example of a system configuration. The first display example illustrated in FIG. 2 is a display example in a prior art of the system configuration provided by an administrator of the cloud infrastructure to the administrator of the tenant A. In the display example illustrated in FIG. 2, the physical resources on which the virtual resources of the tenant A operate are objects to be displayed. In a case where an abnormality occurs in the virtual resources of the tenant A, it is highly likely that there is a cause of the abnormality in the physical resources on which the virtual resources of the tenant A operate. Thus, by providing a system configuration diagram as illustrated in the example of FIG. 2 to the administrator of the tenant A, the administrator of the cloud infrastructure may inform the administrator of the tenant A of some of the physical resources having a high degree of influence on the operation of the tenant A.

However, as illustrated in FIG. 1, the psw_002 (52) to which the storage_002 (32) and the server_003 (43) are connected is also connected to the storage_003 (33) and the server_004 (44) on which the virtual resources of the tenant B operate. Thus, for example, when a communication load of the psw_002 (52) increases due to an increase in a load of the storage_003 (33) or the server_004 (44), or the like, the storage_002 (32) and the server_003 (43) are also affected. In addition, the virtual resources of the tenant A operating on the storage_002 (32) and the server_003 (43) are also affected. However, in the example illustrated in FIG. 2, the storage_003 (33) and the server_004 (44) are not the objects to be displayed. For example, in the example illustrated in FIG. 2, some of the physical resources having a high degree of influence on the tenant A are not the objects to be displayed. In this case, it is difficult for the administrator of the tenant A to specify the physical resource (for example, the storage_003 (33) or the server_004 (44)) that is the cause of the abnormality in the virtual resources even by referring to the display example illustrated in FIG. 2.

Figure 3:
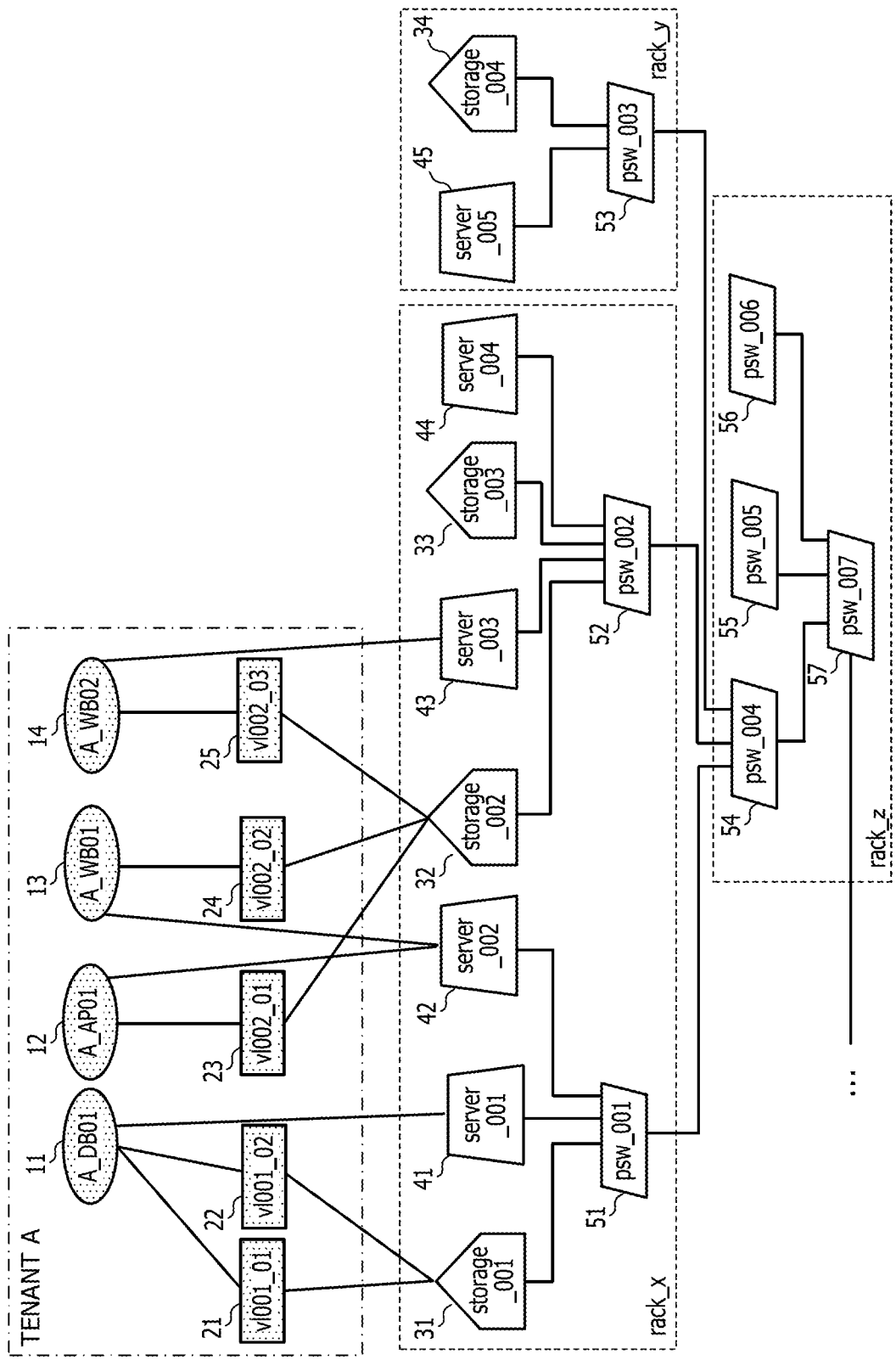
FIG. 3 is a diagram illustrating a second display example of the system configuration.

FIG. 3 is a diagram illustrating a second display example of the system configuration. The second display example illustrated in FIG. 3 is a display example in a prior art of the system configuration provided by the administrator of the cloud infrastructure to the administrator of the tenant A. In the example illustrated in FIG. 3, all physical resources that are directly or indirectly connected to the physical resources on which the virtual resources of the tenant A operate are the objects to be displayed. The second display example may also include, for example, all physical resources in an availability zone including the physical resources on which the virtual resources used by the tenant A operate. Although the second display example is likely to include the physical resource that is the cause of the occurrence of the abnormality in the tenant A, the second display example also includes the physical resource having a low degree of influence on the operation of the virtual resources of the tenant A. Thus, it is difficult for the administrator of the tenant A to specify the physical resource having a high degree of influence on the tenant A even by referring to the display example illustrated in FIG. 3.

Figure 4:
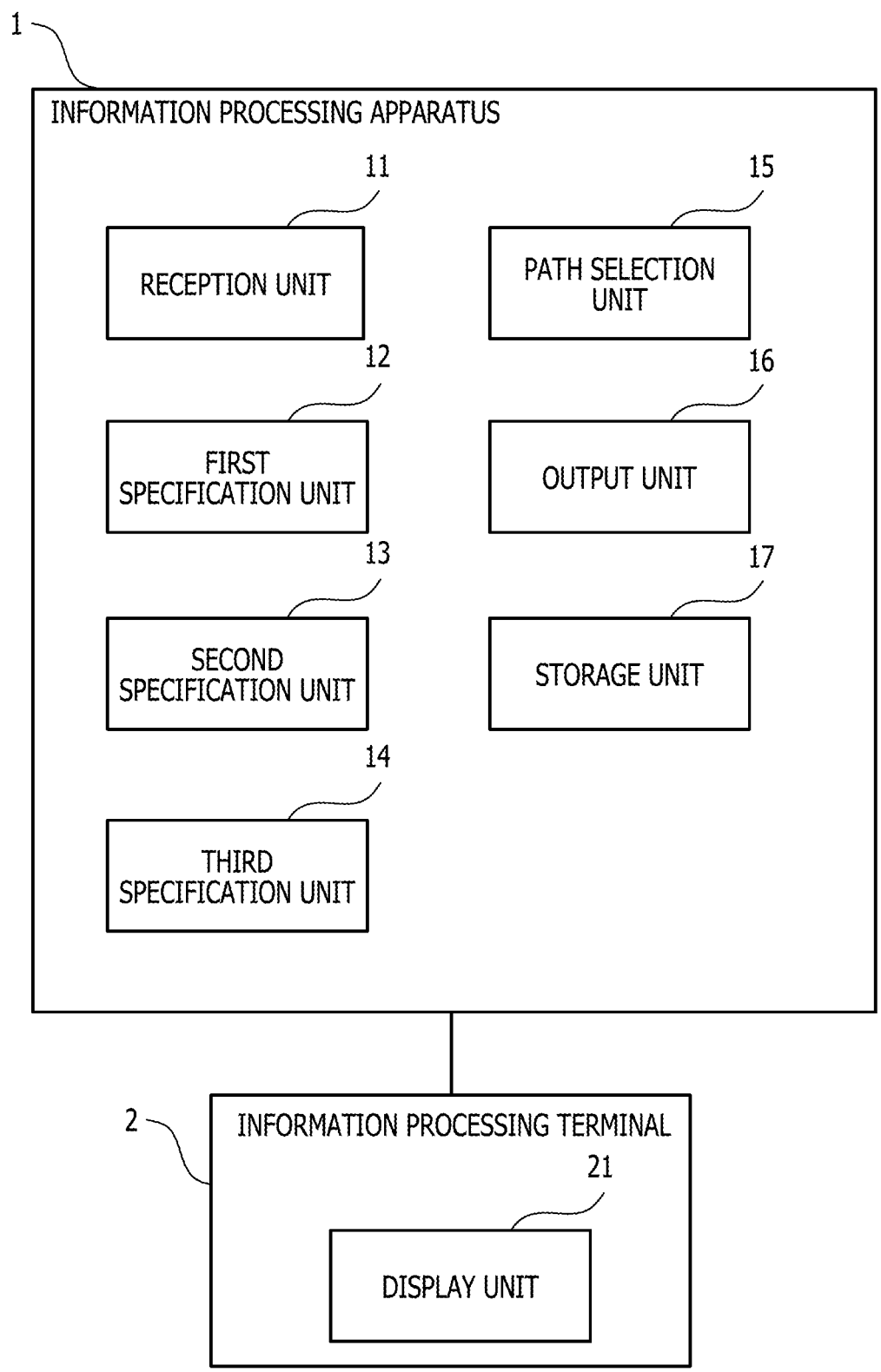
FIG. 4 is a diagram illustrating an example of a functional configuration of an information processing apparatus and an information processing terminal in the first embodiment.

FIG. 4 is a diagram illustrating an example of a functional configuration of an information processing apparatus 1 and an information processing terminal 2 in the first embodiment. The information processing apparatus 1 includes a reception unit 11, a first specification unit 12, a second specification unit 13, a third specification unit 14, a path selection unit 15, an output unit 16, and a storage unit 17. The information processing apparatus 1 is, for example, a server included in the cloud infrastructure and managed by the administrator of the cloud infrastructure. The information processing apparatus 1 is an example of a computer. At least one of the information processing apparatus 1 and the information processing terminal 2 may also be the virtual machine included in the system of FIG. 1.

The reception unit 11 receives identification information of a tenant from the information processing terminal or the like used by the administrator of the customer system. The identification information of a tenant received by the reception unit 11 is identification information of a tenant specified as an investigation object by the administrator of the customer system. Hereinafter, the tenant indicated by the identification information received by the reception unit 11 may be referred to as a specified tenant.

The reception unit 11 receives management information regarding the cloud infrastructure used by the specified tenant. The specified tenant is an example of a first user. Hereinafter, the management information regarding the cloud infrastructure used by the specified tenant may be referred to as management information. The details of the management information will be described later. Note that, in a case where the management information is stored in the storage unit 17 in advance, the reception unit 11 does not have to receive the management information.

The first specification unit 12 specifies one or a plurality of physical resources on which victual resources used by the specified tenant operate. Hereinafter, the physical resource specified by the first specification unit 12 may be referred to as a first physical resource.

The second specification unit 13 specifies a device connected to the first physical resource specified by the first specification unit 12 and one or a plurality of physical resources connected to the device and different from the first physical resource. Hereinafter, the physical resource specified by the second specification unit 13 may be referred to as a second physical resource. The second physical resource is, for example, a physical resource on which virtual resources used by a tenant different from the specified tenant operate.

Note that it is assumed that the device specified by the second specification unit 13 is a device directly connected to the first physical resource, and does not include a device connected to the first physical resource via another physical resource. Furthermore, it is assumed that the second physical resource specified by the second specification unit 13 is a physical resource directly connected to the specified device, and does not include a physical resource connected to the specified device via another physical resource.

The second specification unit 13 may specify a communication device connected to the first physical resource, and may also specify one or a plurality of the second physical resources which is connected to the communication device and on which virtual resources used by a tenant other than the specified tenant operate. The communication device is, for example, a physical router, a physical switch, or the like. In the present embodiment, the physical switch is applied as the communication device. For example, in a case where a failure, congestion, or the like occurs in the communication device connected to the first physical resource, a processing delay or the like may occur in virtual resources operating on the first physical resource.

The second specification unit 13 may also specify a wiring plug device connected to the first physical resource. Then, the second specification unit 13 may also specify one or a plurality of the second physical resources which is connected to the wiring plug device and on which virtual resources used by a tenant different from the specified tenant operate, and a communication device connected to the wiring plug device. The wiring plug device is a connector for supplying power to a physical resource, for example, an outlet, a cord connector body, a multi-tap, and the like.

The device is, for example, a communication device (relay device) of a layer 2 or higher, and when specifying one or a plurality of the second physical resources, the second specification unit 13 may also exercise control such that a physical resource connected to the device via another communication device (relay device) of a layer 2 or higher is not specified as the second physical resource. With this configuration, the excessive number of second physical resources may be prevented from being specified.

The third specification unit 14 specifies operation status of the first physical resource and the second physical resource. The third specification unit 14 may also specify operation status of the communication device specified by the second specification unit 13. The third specification unit 14 specifies, for example, a physical resource in which a failure occurs among the first physical resource, the second physical resource, and the communication device. Examples of the failure include a device failure, communication congestion, electric leakage, and the like.

The path selection unit 15 selects, in a case where the second specification unit 13 specifies the communication device connected to the first physical resource and a plurality of the communication devices exists, the shortest communication path among communication paths connecting the plurality of communication devices to each other. Hereinafter, the shortest communication path among the communication paths connecting the plurality of communication devices connected to the first physical resource to each other may be simply referred to as the shortest communication path. Then, the path selection unit 15 specifies a communication device existing in the shortest communication path.

The output unit 16 outputs information indicating the first physical resource specified by the first specification unit 12 and information indicating the second physical resource specified by the second specification unit 13. The output unit 16 causes a display device to display, for example, identification information of the first physical resource and identification information of the second physical resource. The display device may be mounted on the information processing apparatus 1 or may also be connected to the information processing apparatus 1. The output unit 16 may also, for example, transmit the information indicating the first physical resource and the information indicating the second physical resource to the external information processing terminal 2.

In a case where the second specification unit 13 specifies the communication device connected to the first physical resource, the output unit 16 may also output information indicating the communication device. The information indicating the communication device is, for example, identification information of the communication device.

The output unit 16 may also output the identification information of the first physical resource, the second physical resource, and the communication device in modes corresponding to the operation status specified by the third specification unit 14. For example, the output unit 16 may also output, in different modes, the information indicating a physical resource in which a failure occurs and which is specified by the third specification unit 14, and the information indicating other physical resources, among the first physical resource, the second physical resource, and the communication device.

The output unit 16 may also output, in different modes, the information indicating the first physical resource and the information indicating the second physical resource.

The output unit 16 may also output information indicating the communication device which exists in the shortest communication path and is selected by the path selection unit 15.

In a case where the second specification unit 13 specifies the wiring plug device connected to the first physical resource and specifies the communication device connected to the wiring plug device, the output unit 16 may also output information indicating the communication device.

The output unit 16 may also output a system configuration diagram of the cloud infrastructure including the information indicating the first physical resource and the information indicating the second physical resource. Furthermore, the output unit 16 may also output a hierarchical list of information indicating each physical resource in the cloud infrastructure including the first physical resource and the second physical resource.

The storage unit 17 stores the management information regarding the cloud infrastructure used by the specified tenant, which is received by the reception unit 11. The storage unit 17 may also store the management information in advance.

The information processing terminal 2 is connected to the information processing apparatus 1. A display unit 21 of the information processing terminal 2 performs display based on the information output from the output unit 16.

Hereinafter, an example of each piece of information included in the management information stored in the storage unit 17 will be described. FIG. 5 is a diagram illustrating an example of information indicating a relationship between the tenant and the virtual machine in the first embodiment. In the example illustrated in FIG. 5, identification information of the tenant and identification information of the virtual machine used by the tenant are associated with each other.

FIG. 6 is a diagram illustrating an example of information indicating a relationship between the tenant and the volume in the first embodiment. In the example illustrated in FIG. 6, the identification information of the tenant and identification information of the volume used by the tenant are associated with each other.

By referring to the information indicated in FIGS. 5 and 6, the first specification unit 12 may specify the virtual resources (virtual machine and volume) used by the specified tenant.

FIG. 7 is a diagram illustrating an example of information indicating a relationship between the virtual machine and the physical server in the first embodiment. In the example illustrated in FIG. 7, the identification information of the virtual machine and identification information of the physical server on which the virtual machine operates are associated with each other.

FIG. 8 is a diagram illustrating an example of information indicating a relationship between the volume and the physical storage in the first embodiment. In the example illustrated in FIG. 8, the identification information of the volume and identification information of the physical storage on which the volume operates are associated with each other.

By referring to the information indicated in FIGS. 5 to 8, the first specification unit 12 may specify the first physical resources (physical server and physical storage) on which the virtual resources (virtual machine and volume) used by the specified tenant operate.

FIG. 9 is a diagram illustrating an example of information indicating a relationship between the physical server and the rack in the first embodiment. In the example illustrated in FIG. 9, the identification information of the physical server and identification information of the rack on which the physical server is mounted are associated with each other.

FIG. 10 is a diagram illustrating an example of information indicating a relationship between the physical storage and the rack in the first embodiment. In the example illustrated in FIG. 10, the identification information of the physical storage and the identification information of the rack on which the physical storage is mounted are associated with each other.

FIG. 11 is a diagram illustrating an example of information indicating a relationship between the physical switch and the rack in the first embodiment. In the example illustrated in FIG. 11, identification information of the physical switch and the identification information of the rack on which the physical switch is mounted are associated with each other.

Note that it is assumed that physical resources mounted on the same rack are connected to the same wiring plug device. Thus, by referring to the information indicated in FIGS. 9 and 10, the second specification unit 13 specifies the wiring plug device connected to the first physical resources (physical server and physical storage) and the second physical resources connected to the wiring plug device.

For example, by referring to the information indicated in FIGS. 9 and 10, the second specification unit 13 specifies the rack associated with the first physical resources, thereby specifying the wiring plug device connected to the first physical resources. Then, by referring to the information indicated in FIGS. 9 to 11, the second specification unit 13 specifies the physical resources associated with the specified rack, thereby specifying the second physical resources and the communication device that are connected to the specified wiring plug device.

FIG. 12 is a diagram illustrating an example of information indicating a relationship between the physical server and the physical switch in the first embodiment. In the example illustrated in FIG. 12, the identification information of the physical server and the identification information of the physical switch connected to the physical server are associated with each other.

FIG. 13 is a diagram illustrating an example of information indicating a relationship between the physical storage and the physical switch in the first embodiment. In the example illustrated in FIG. 13, the identification information of the physical storage and the identification information of the physical switch connected to the physical storage are associated with each other.

By referring to the information indicated in FIGS. 12 and 13, the second specification unit 13 may specify the communication device (physical switch) connected to the first physical resources (physical server and physical storage) and the second physical resources.

For example, by referring to the information indicated in FIGS. 12 and 13, the second specification unit 13 specifies the communication device associated with the first physical resources, thereby specifying the communication device connected to the first physical resources. Then, by referring to the information indicated in FIGS. 12 and 13, the second specification unit 13 specifies the physical resources associated with the specified communication device, thereby specifying the second physical resources connected to the specified communication device.

FIG. 14 is a diagram illustrating an example of information indicating a connection relationship between the physical switches in the first embodiment. In the example illustrated in FIG. 14, the identification information of the physical switch and the identification information of the physical switch connected to the physical switch are associated with each other.

In a case where a plurality of the communication devices connected to the first physical resources exists, the path selection unit 15 selects, by referring to the information indicated in FIG. 14, the shortest communication path among communication paths connecting the plurality of communication devices (physical switches) to each other, and specifies a communication device existing in the shortest communication path.

FIG. 15 is a diagram illustrating an example of information indicating presence or absence of a failure in the physical resources in the first embodiment. In the example illustrated in FIG. 15, the identification information of the physical resources (physical servers, physical storages, and physical switches) is associated with presence or absence of a failure in the physical resources. The information indicated in FIG. 15 may also include, for example, content of a failure and the like.

The third specification unit 14 may specify, on the basis of the information indicated in FIG. 15, a physical resource in which a failure occurs among the first physical resources, the second physical resources, and the communication device.

Each piece of the information indicated in FIGS. 5 to 15 is stored in the storage unit 17 as the management information regarding the cloud infrastructure.

Figure 16:
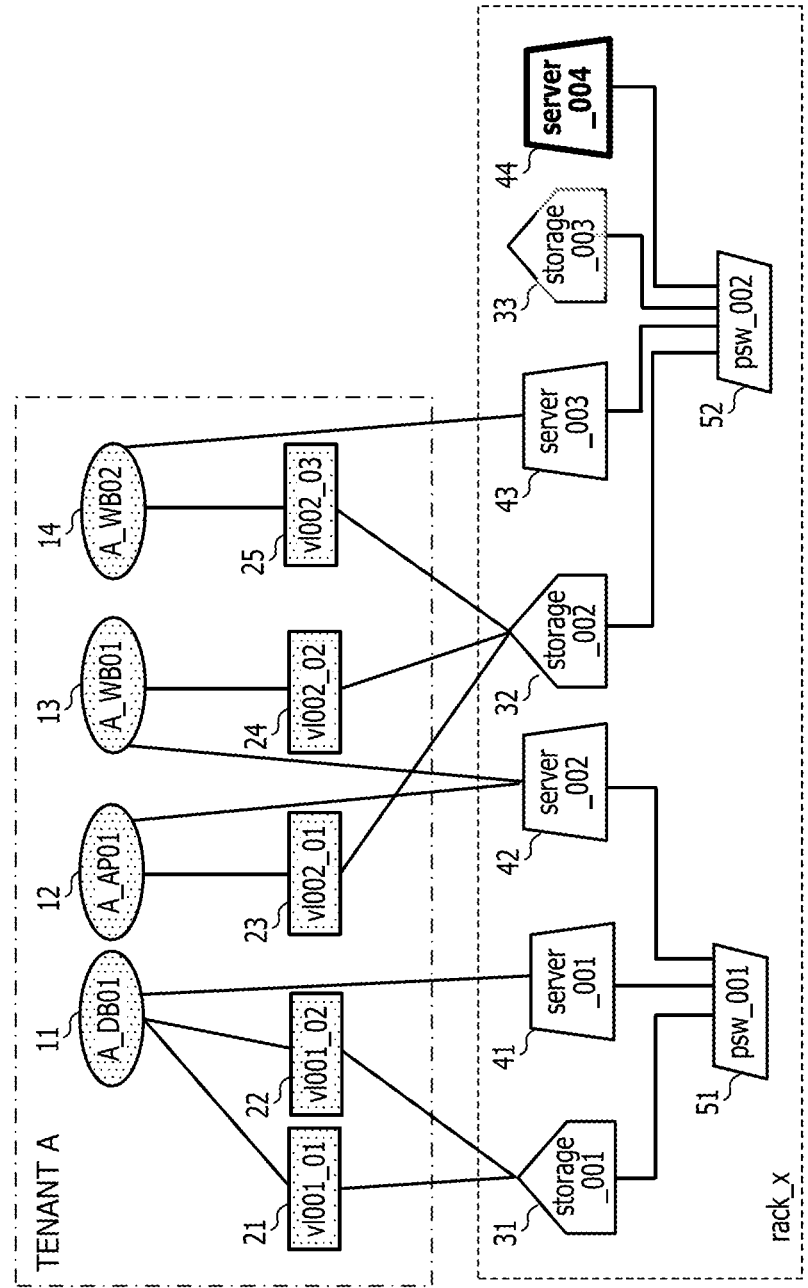
FIG. 16 is a diagram illustrating a third display example of the system configuration.

FIG. 16 is a diagram illustrating a third display example of the system configuration. In the third display example, the specified tenant is assumed to be the tenant A. The first specification unit 12 specifies the first physical resources on which the virtual resources used by the tenant A operate. The first physical resources in the example illustrated in FIG. 16 are the storage_001 (31), the storage_002 (32), the server_001 (41), the server_002 (42), and the server_003 (43).

The second specification unit 13 specifies the psw_001 (51) and the psw_002 (52) as the communication devices connected to the first physical resources specified by the first specification unit 12. Furthermore, the second specification unit 13 specifies the second physical resources which are connected to the psw_001 (51) or the psw_002 (52) and on which the virtual resources used by the tenant B different from the specified tenant operate. The second physical resources in the example illustrated in FIG. 16 are the storage_003 (33) and the server_004 (44).

The third specification unit 14 specifies, by referring to the information indicated in the example in FIG. 15, the physical resource in which a failure occurs (server_004 (44)) among the first physical resources, the second physical resources, and the communication devices.

The output unit 16 displays the identification information of the first physical resources, the identification information of the second physical resources, and the identification information of the communication devices connected to the first physical resources described above. Furthermore, the output unit 16 displays, in different modes, the identification information of the physical resource in which a failure occurs (server_004 (44)) and which is specified by the third specification unit 14 and the identification information of other physical resources. For example, as illustrated in FIG. 16, the output unit 16 emphatically displays an icon including the identification information of the physical resource in which a failure occurs. The output unit 16 may also display, in different colors or forms, the icon indicating the physical resource in which a failure occurs and icons indicating other physical resources. The output unit 16 may also display the identification information of the physical resource in which a failure occurs in different modes depending on the content of the failure, and the like.

It is considered that the communication device connected to the first physical resources and the second physical resources connected to the communication device are likely to affect the virtual resources operating on the first physical resource. Thus, the information processing apparatus 1 may notify the administrator of the tenant A of the physical resource having a high degree of influence on the operation of the virtual resources of the tenant A by displaying the system configuration illustrated in FIG. 16. By preferentially investigating the displayed physical resource, the administrator of the tenant A may quickly specify a cause of the abnormality occurred in the virtual resources, for example.

Furthermore, in the example illustrated in FIG. 16, the identification information of the physical resource in which a failure occurs (server_004 (44)) and the identification information of other physical resources are displayed in different modes. Thus, the administrator of the tenant A may presume that the cause of the abnormality in the virtual resources is the server_004 (44). With this configuration, the administrator of the tenant A may quickly know whether the cause of the abnormality occurred in the virtual resources exists in the physical resources or the virtual resources in the cloud infrastructure.

Furthermore, for example, it is assumed that a processing delay or the like occurs in the A_WB02 (14), and the only physical resource in which a failure occurs is the storage_001 (31). In a case where the first physical resource is only the A_WB02 (14), the storage_001 (31) does not correspond to the second physical resource specified by the second specification unit 13, and thus display is not performed. In this case, a user may infer that there is a problem with the virtual resource (A_WB02 (14)) rather than the physical resource.

Figure 17:
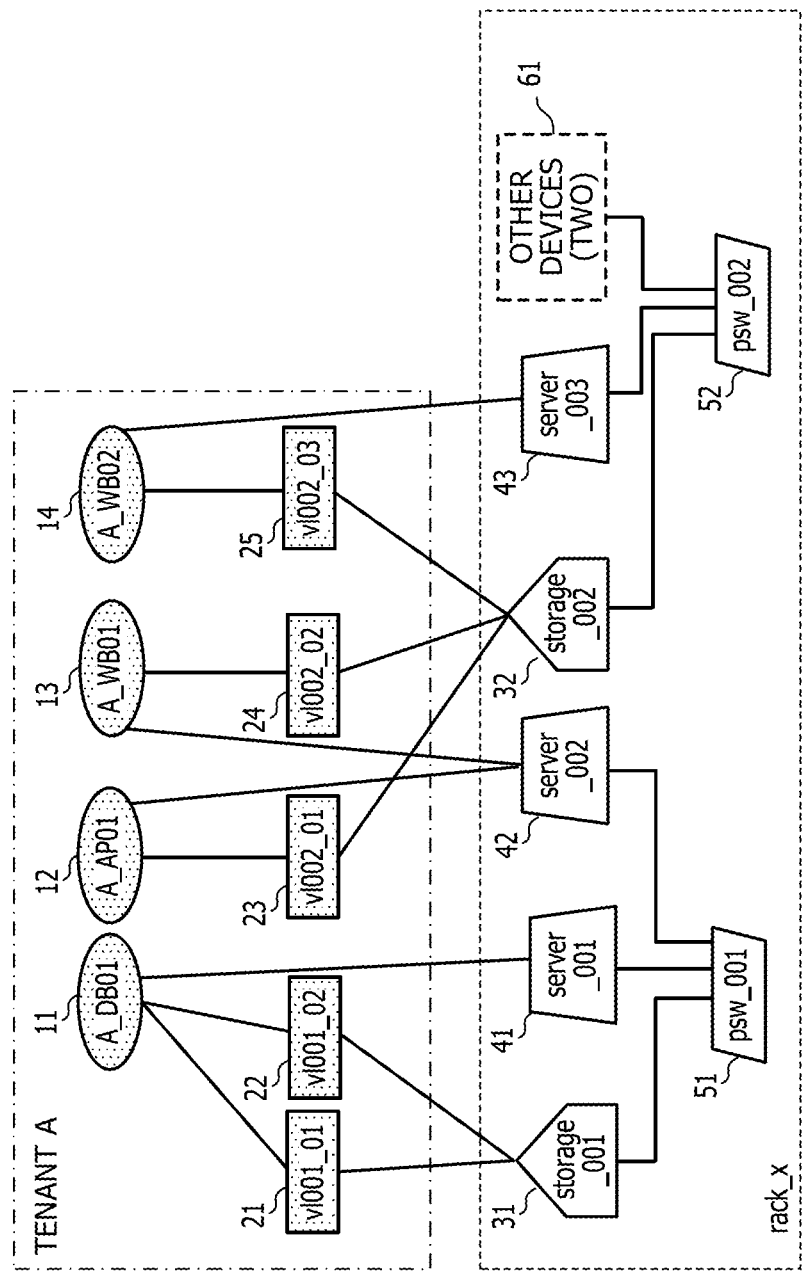
FIG. 17 is a diagram illustrating a fourth display example of the system configuration.

FIG. 17 is a diagram illustrating a fourth display example of the system configuration. The fourth display example illustrated in FIG. 17 is different from the example illustrated in FIG. 16 in that the information indicating the first physical resources and the information indicating the second physical resources are displayed in different modes. Other devices (two) 61 in FIG. 17 is a simple display of the second physical resources (storage_003 (33) and server_004 (44)). Since the second physical resources are less likely to affect the specified tenant than the first physical resources, the second physical resources are simply displayed.

Note that, in a case where the physical resource in which a failure occurs specified by the third specification unit 14 exists in the second physical resources, the output unit 16 may also display the physical resource in a normal display (display similar to FIG. 16) instead of a simple display. The output unit 16 may also hide physical resources other than the physical resource in which a failure occurs among the second physical resources.

By outputting the display example illustrated in FIG. 17, the information processing apparatus 1 may more easily specify the physical resource that causes the abnormality.

Note that, although FIGS. 16 and 17 illustrate the examples in which processing by the path selection unit 15 is not performed, the processing by the path selection unit 15 may be executed, and the output unit 16 may also output the identification information of the communication device existing in the shortest communication path selected by the path selection unit 15.

Figure 18:
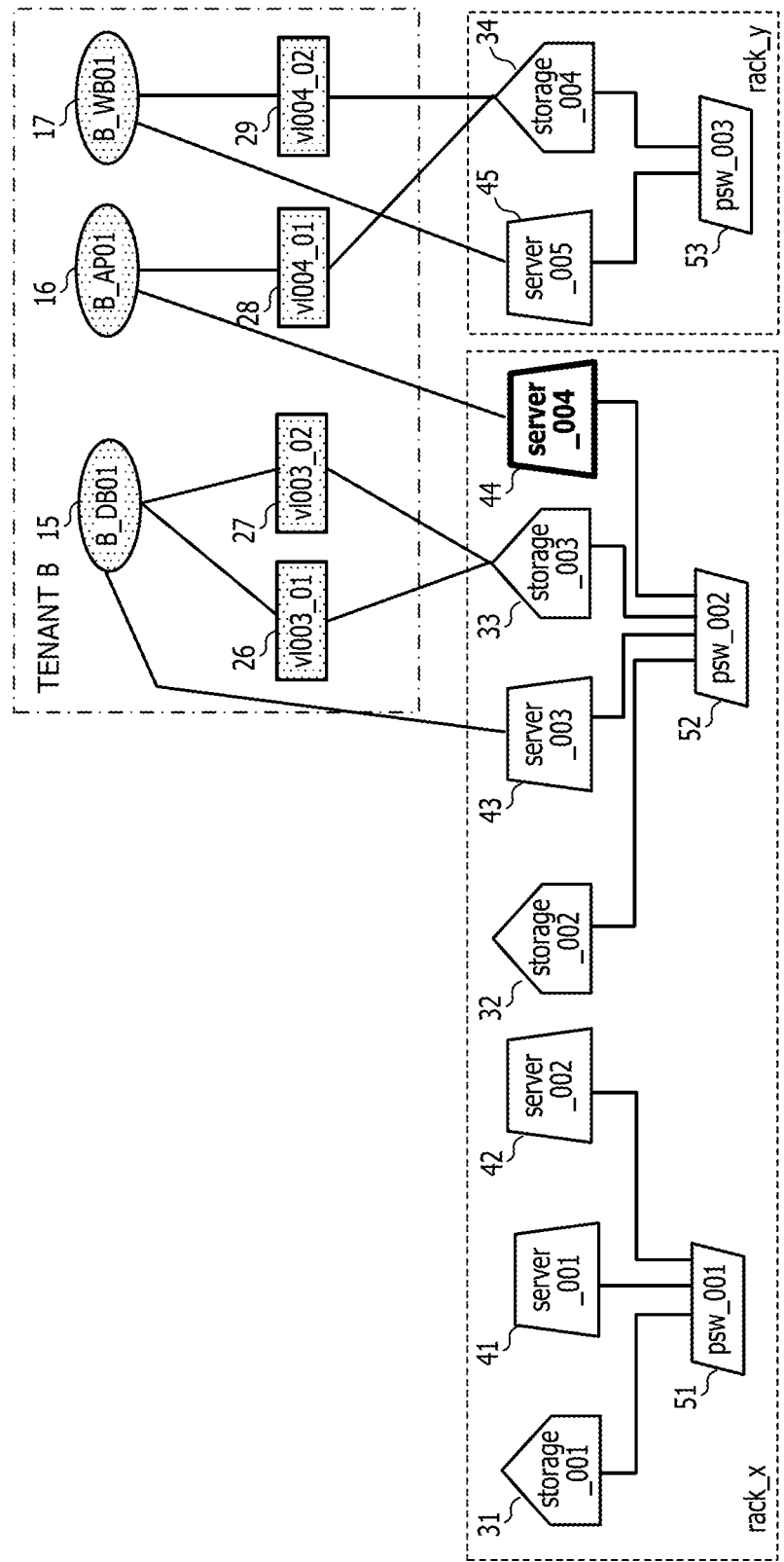
FIG. 18 is a diagram illustrating a fifth display example of the system configuration.

FIG. 18 is a diagram illustrating a fifth display example of the system configuration. In the fifth display example, the specified tenant is assumed to be the tenant B. The first specification unit 12 specifies the first physical resources on which the virtual resources used by the tenant B operate. The first physical resources in the fifth display example are the storage_003 (33), the storage_004 (34), the server_003 (43), the server_004 (44), and the server_005 (45).

The second specification unit 13 specifies the wiring plug device connected to the first physical resources specified by the first specification unit 12. Then, the second specification unit 13 specifies one or a plurality of the second physical resources which is connected to the wiring plug device and on which virtual resources used by a tenant different from the specified tenant operate, and the communication device connected to the wiring plug device. As described above, the physical resources existing in the same rack are connected to the same wiring plug device. Thus, the second specification unit 13 specifies, by referring to the information indicated in FIGS. 9 to 11, the second physical resources and the communication devices that are mounted on the racks (rack_x and rack_y) on which the first physical resources are mounted.

In the example illustrated in FIG. 18, the second specification unit 13 specifies the storage_001 (31), the storage_002 (32), the server_001 (41), and the server_002 (42) as the second physical resources. Furthermore, the second specification unit 13 specifies the psw_001 (51), the psw_002 (52), and the psw_003 (53) as the communication devices.

The third specification unit 14 specifies, by referring to the information indicated in the example in FIG. 15, the physical resource in which a failure occurs (server_004 (44)) among the first physical resources, the second physical resources, and the communication devices.

The output unit 16 displays the identification information of the first physical resources, the identification information of the second physical resources, and the identification information of the communication devices, which are specified. Furthermore, the output unit 16 displays, in different modes, the identification information of the physical resource in which a failure occurs (server_004 (44)) and which is specified by the third specification unit 14, and the identification information of other physical resources.

For example, in a case where electric leakage occurs in the second physical resources, the first physical resources connected to the wiring plug device connected to the second physical resources may lose power, and the virtual resources operating on the first physical resources may stop. Thus, the information processing apparatus 1 may notify the administrator of the tenant B of the physical resource having a high degree of influence on the operation of the virtual resources of the tenant B by displaying the identification information of the second physical resources and the communication devices connected to the wiring plug device connected to the first physical resources.

Figure 19:
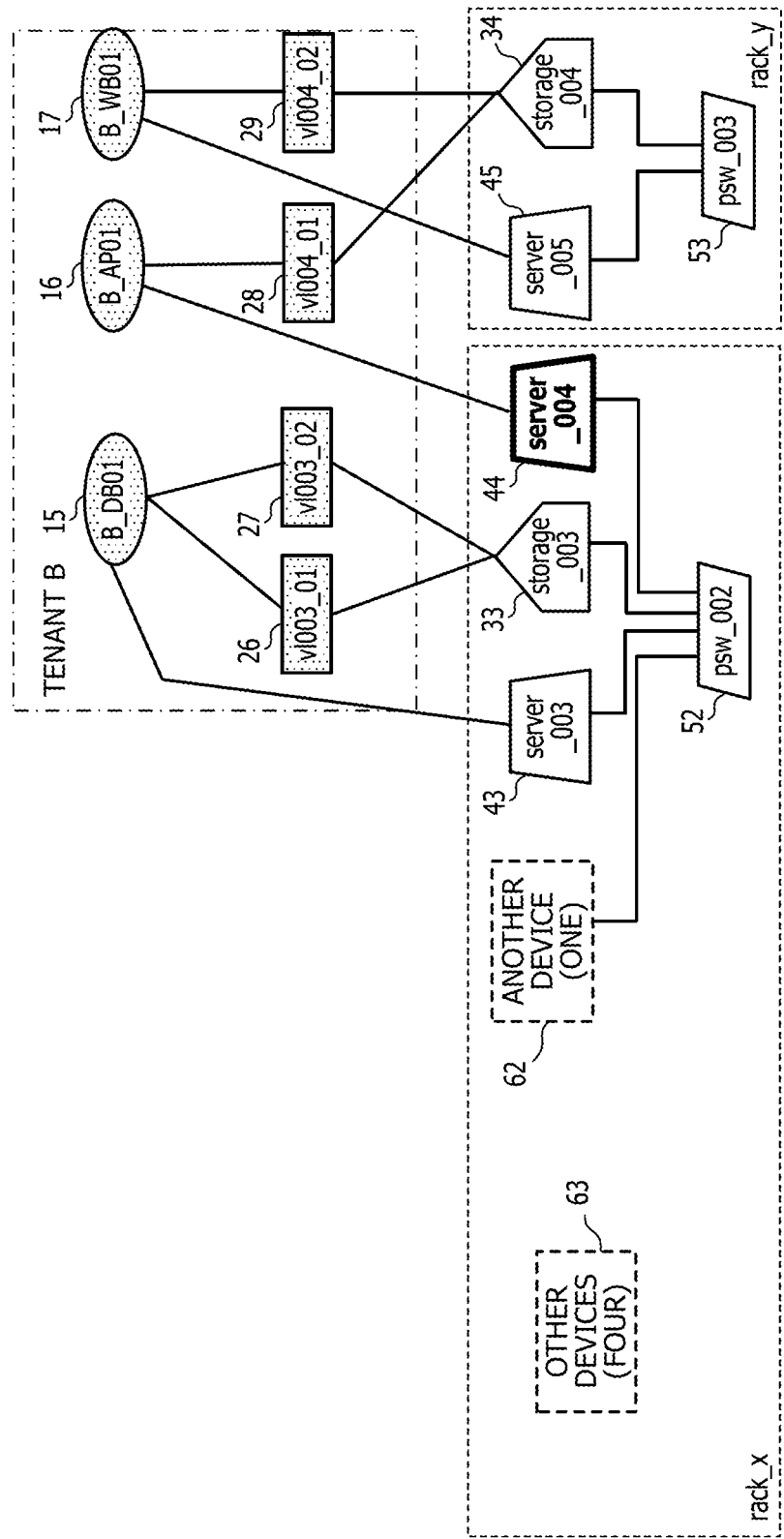
FIG. 19 is a diagram illustrating a sixth display example, of the system configuration.

FIG. 19 is a diagram illustrating a sixth display example of the system configuration. The example illustrated in FIG. 19 is different from the example illustrated in FIG. 18 in that the storage_001 (31), the storage_002 (32), the server_001 (41), the server_002 (42), and the psw_001 (51) are simply displayed. Another device (one) 62 is a simple display of the storage_002 (32). Other devices (four) 63 is a simple display of the storage_001 (31), the server_001 (41), the server_002 (42), and the psw_001 (51).

The storage_001 (31), the storage_002 (32), the server_001 (41), and the server_002 (42) are the second physical resources. In the example illustrated in FIG. 19, the output unit 16 outputs, in different modes, the identification information indicating the first physical resources and the identification information indicating the second physical resources.

The psw_002 (52) and the psw_003 (53) are the communication devices connected to the first physical resources. The psw_001 (51) is a communication device that is connected to the wiring plug device connected to the first physical resources and is not connected to the first physical resources. In the example illustrated in FIG. 19, the output unit 16 outputs, in different modes, the identification information of the communication devices connected to the first physical resources and the identification information of the communication device that is connected to the wiring plug device connected to the first physical resources and is not connected to the first physical resources.

It is considered that the communication device that is connected to the wiring plug device connected to the first physical resources and is not connected to the first physical resources has a lower degree of influence on the virtual resources operating on the first physical resources compared to the communication devices connected to the first physical resources. Thus, by outputting the display example illustrated in FIG. 19, the information processing apparatus 1 may more easily specify the physical resource that causes the abnormality.

Figure 20:
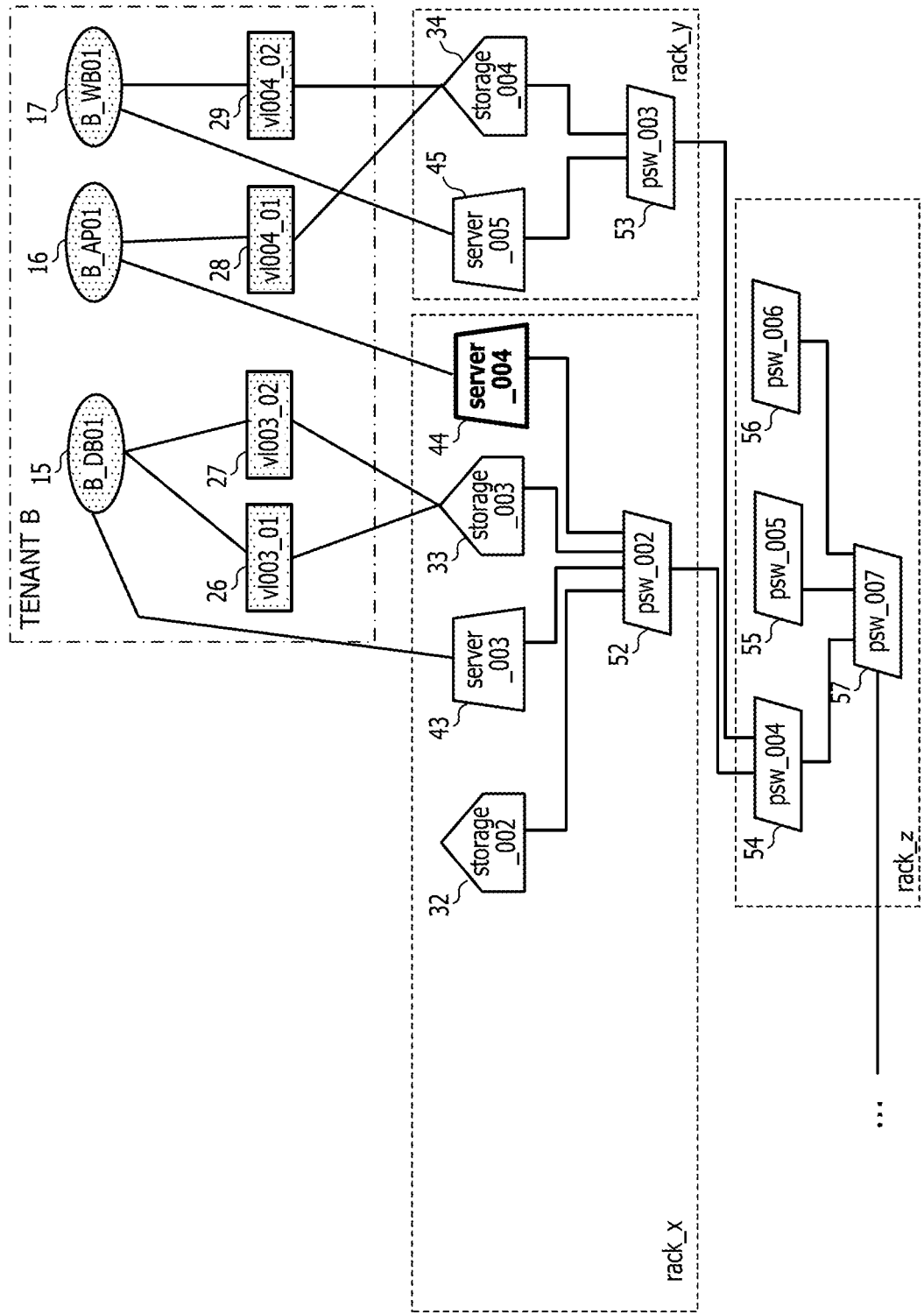
FIG. 20 is a diagram illustrating a seventh display example of the system configuration.

FIG. 20 is a diagram illustrating a seventh display example of the system configuration. In the seventh display example, the specified tenant is assumed to be the tenant B. The first specification unit 12 specifies the first physical resources on which the virtual resources used by the tenant B operate. The first physical resources in the seventh display example are the storage_003 (33), the storage_004 (34), the server_003 (43), the server_004 (44), and the server_005 (45).

The second specification unit 13 specifies the psw_002 (52) and the psw_003 (53) as the communication devices connected to the first physical resources specified by the first specification unit 12. The second specification unit 13 specifies the second physical resource which is connected to the psw_002 (52) or the psw_003 (53) and on which the virtual resources used by the tenant A different from the specified tenant operate. The second physical resource in the seventh display example is the storage_002 (32).

The third specification unit 14 specifies, by referring to the information indicated in the example in FIG. 15, the physical resource in which a failure occurs (server_004 (44)) among the first physical resources, the second physical resource, and the communication devices.

In the example illustrated in FIG. 20, a plurality of the communication devices (psw_002 (52) and psw_003 (53)) which is connected to the first physical resources and is specified by the second specification unit 13 exists. Thus, the path selection unit 15 selects the shortest communication path among communication paths connecting the psw_002 (52) and the psw_003 (53). Then, the path selection unit 15 specifies a communication device existing in the shortest communication path (psw_004 (54)). Furthermore, the path selection unit 15 may also further specify, on the basis of the information indicated in FIG. 11, other communication devices connected to the wiring plug device to which the communication device existing in the shortest communication path is connected. In the example illustrated in FIG. 20, the other communication devices are the psw_005 (55), the psw_006 (56), and the psw_007 (57).

The output unit 16 displays the identification information of the first physical resources, the identification information of the second physical resource, and the identification information of the communication devices, which are specified. Furthermore, the output unit 16 displays, in different modes, the identification information of the physical resource in which a failure occurs (server_004 (44)) and which is specified by the third specification unit 14 and the identification information of other physical resources.

Furthermore, the output unit 16 outputs the identification information (psw_004 (54)) of the communication device existing in the shortest communication path selected by the path selection unit 15. Then, the output unit 16 may also further output the identification information (psw_005 (55), psw_006 (56), and psw_007 (57)) of the other communication devices connected to the wiring plug device to which the communication device is connected.

The shortest communication path between the plurality of communication devices connected to the first physical resources selected by the path selection unit 15 is likely to be a communication path for communication between the first physical resources. Thus, in a case where a failure, congestion, or the like occurs in the communication device existing in the shortest communication path, a processing delay or the like may occur in the virtual resources operating on the first physical resources. Thus, the information processing apparatus 1 may notify the administrator of the tenant B of the communication device having a high degree of influence on the operation of the virtual resources of the tenant B by displaying the seventh display example illustrated in FIG. 20.

Figure 21:
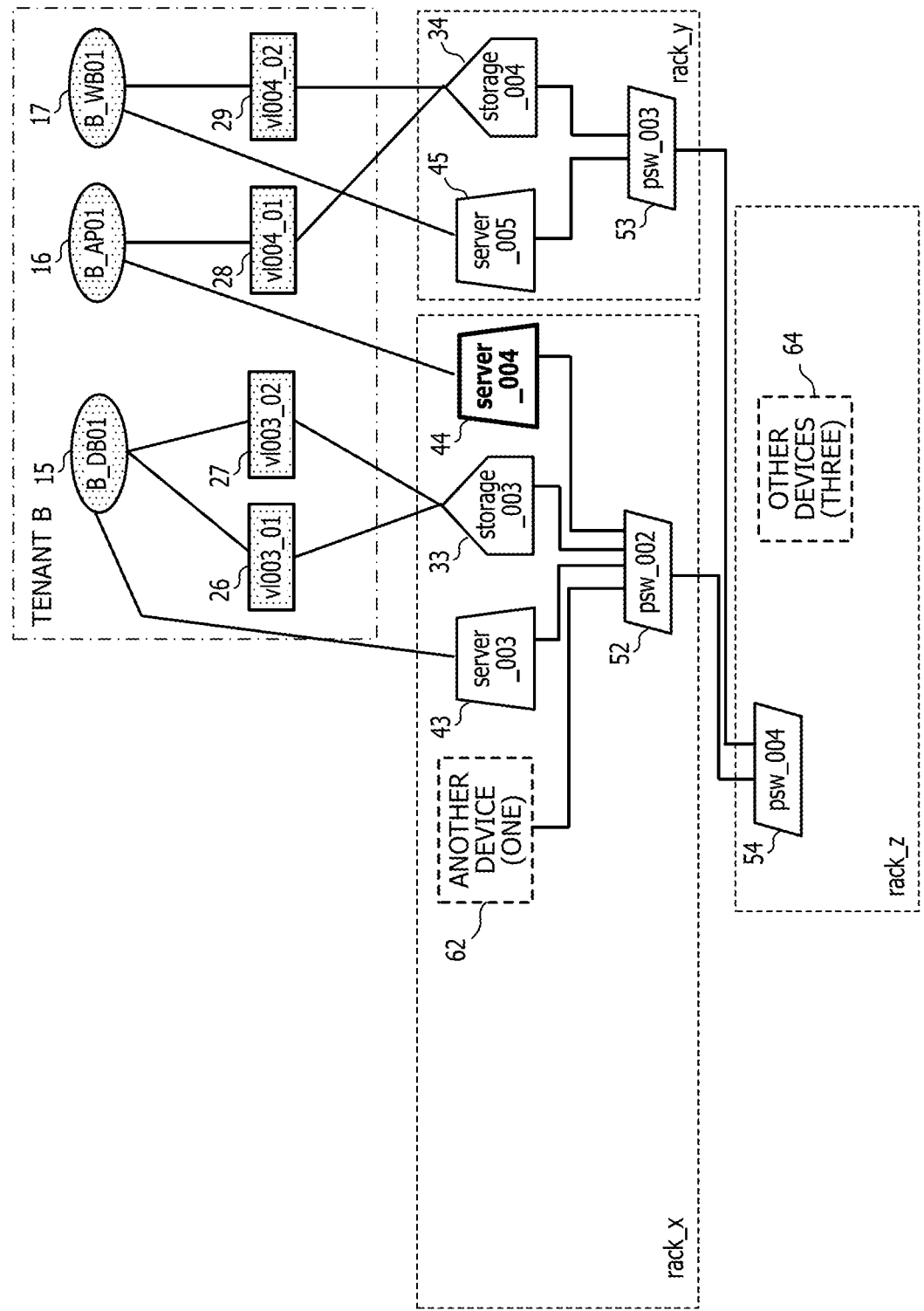
FIG. 21 is a diagram illustrating an eighth display example of the system configuration.

FIG. 21 is a diagram illustrating an eighth display example of the system configuration. The example illustrated in FIG. 21 is different from the example illustrated in FIG. 20 in that the storage_002 (32), the psw_005 (55), psw_006 (56), and psw_007 (57) are simply displayed. The another device (one) 62 is a simple display of the storage_002 (32). Other devices (three) 64 is a simple display of the psw_005 (55), the psw_006 (56), and the psw_007 (57).

The storage_002 (32) is the second physical resource. Thus, similarly to the example illustrated in FIG. 19, the output unit 16 outputs, in different modes, the identification information indicating the first physical resources and the identification information indicating the second physical resource.

Similarly to the example illustrated in FIG. 20, the path selection unit 15 specifies other communication devices connected to the wiring plug device to which the communication device existing in the shortest communication path is connected. Then, in a case where the other communication devices are not connected to the first physical resources, the output unit 16 outputs, in different modes, the identification information of the communication device existing in the shortest communication path and the identification information of the other communication devices. In FIG. 21, the identification information of the communication device existing in the shortest communication path is the psw_004 (54), and the identification information of the other communication devices is the other devices (three) 64.

It is considered that the other communication devices (psw_005 (55), psw_006 (56), and psw_007 (57)) have a lower degree of influence on the operation of the virtual resources used by the specified tenant B than the communication device (psw_004 (54)) existing in the shortest communication path. Thus, by displaying the system configuration illustrated in FIG. 21, the information processing apparatus 1 may more easily specify the physical resource that causes the abnormality.

As illustrated in FIGS. 16 to 21, for example, the output unit 16 outputs the system configuration diagram of the cloud infrastructure including the information indicating the first physical resource and the information indicating the second physical resource. Next, an example in which the output unit 16 outputs the system configuration of the cloud infrastructure as a list will be described.

Figure 22:
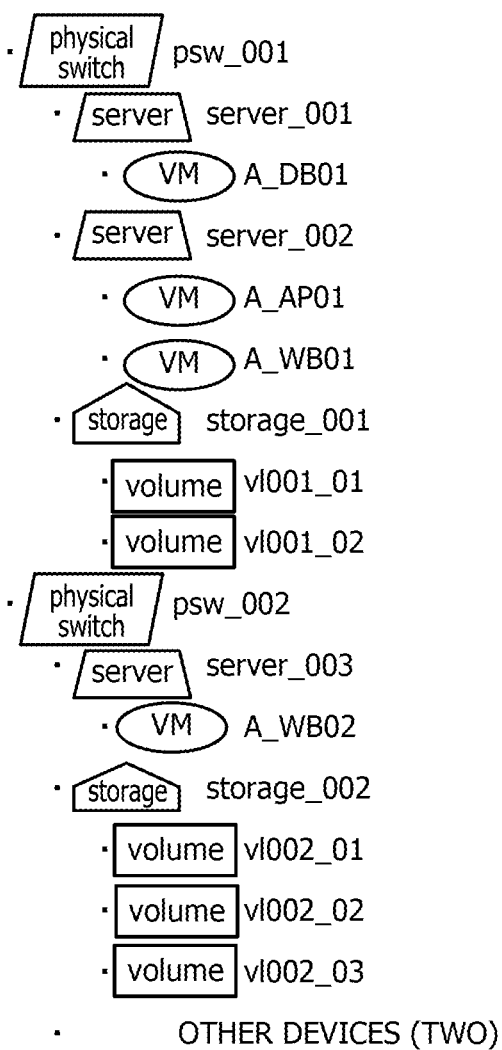
FIG. 22 is a diagram illustrating a ninth display example of the system configuration.

FIG. 22 is a diagram illustrating a ninth display example of the system configuration. As illustrated in FIG. 22, the output unit 16 may also display, in a list, the identification information of each virtual resource and the identification information of each physical resource together with icons indicating types of the virtual resources and the physical resources. Note that, in the icons illustrated in FIG. 22, "VM" indicates a virtual machine.

In FIG. 22, the identification information indicating each virtual resource and the identification information indicating each physical resource are displayed hierarchically. In the example illustrated in FIG. 22, the identification information of the physical server and the physical storage is displayed below the physical switch to which the physical server and the physical storage are connected. Furthermore, the identification information of the virtual resources is displayed below the physical resources on which the virtual resources operate.

Note that, although FIG. 22 corresponds to the system configuration diagram illustrated in FIG. 17, the output unit 16 may also output lists corresponding to FIGS. 16 and 18 to 21.

The output unit 16 causes the display device to display, for example, the figures illustrated in FIGS. 16 to 22 described above. Furthermore, the output unit 16 may output information used for the display illustrated in FIGS. 16 to 22 to the information processing terminal 2, and the information processing terminal 2 may also display the display examples illustrated in FIGS. 16 to 22.

The information processing apparatus 1 may notify the administrator of the tenant A of the physical resource having a high degree of influence on the operation of the virtual resources by outputting the display example illustrated in FIG. 22. Furthermore, the information processing apparatus 1 may inform the administrator of the tenant A of a hierarchical structure of the cloud infrastructure including the first physical resource and the second physical resource.

Figure 23:
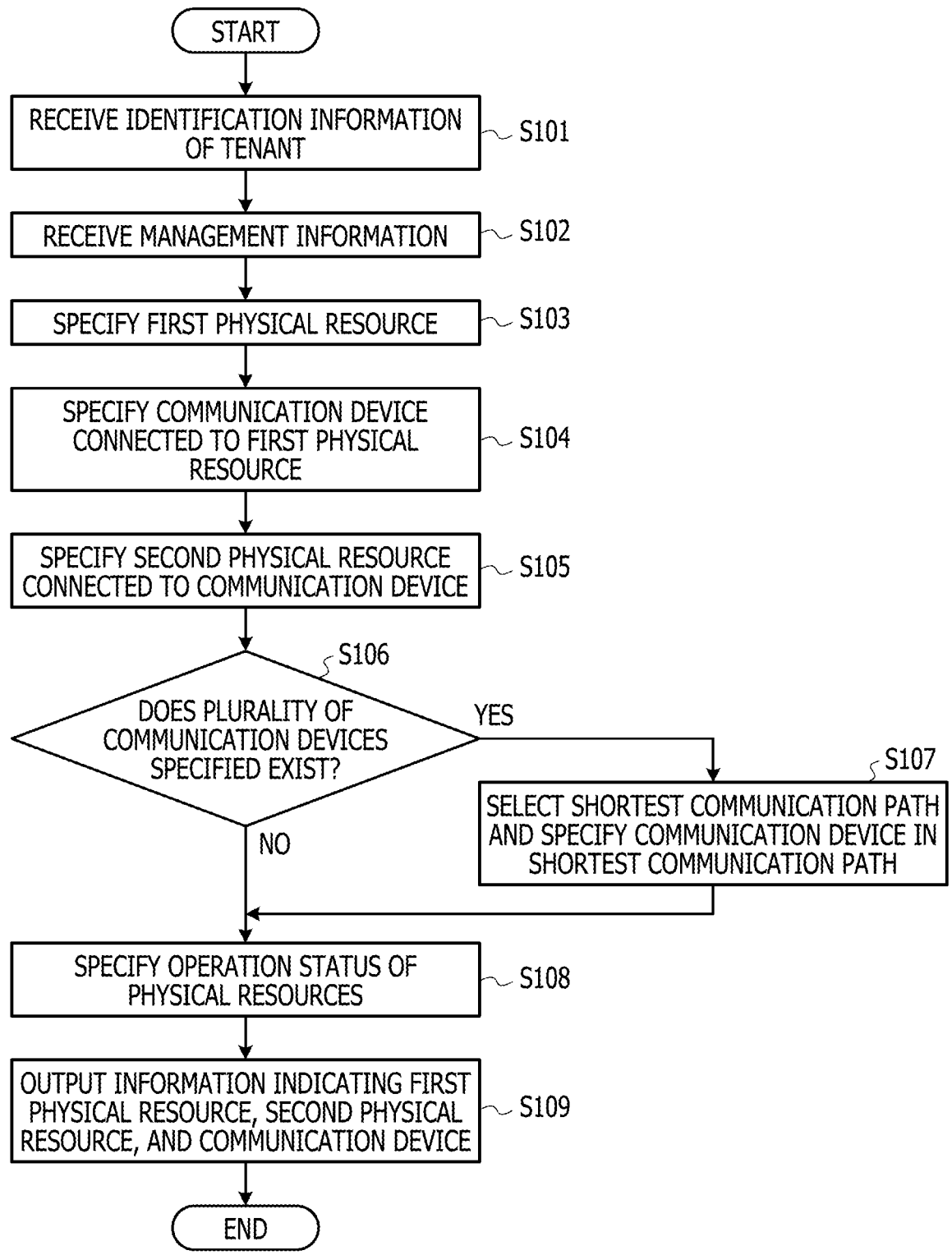
FIG. 23 is a flowchart illustrating a first example of processing of the first embodiment.

FIG. 23 is a flowchart illustrating a first example of processing of the first embodiment. The first example of the processing of the first embodiment is an example in which the second specification unit 13 specifies the communication device as the device.

The reception unit 11 receives identification information of a tenant from the information processing terminal or the like of the administrator of the customer system (Step S101). The identification information of a tenant is identification information of a tenant specified as an investigation object by the administrator of the customer system. Then, the reception unit 11 receives management information regarding the cloud infrastructure used by the specified tenant (Step S102).

The first specification unit 12 specifies one or a plurality of first physical resources on which virtual resources used by the specified tenant operate (Step S103). The second specification unit 13 specifies a communication device connected to the first physical resource specified by the first specification unit 12 (Step S104). The second specification unit 13 specifies one or a plurality of second physical resources which is connected to the communication device and on which virtual resources used by a tenant different from the specified tenant operate (Step S105).

The path selection unit 15 determines whether a plurality of the communication devices specified by the second specification unit 13 in Step S104 exists (Step S106). In a case where the plurality of communication devices specified by the second specification unit 13 exists (YES in Step S106), the path selection unit 15 selects the shortest communication path among communication paths connecting the plurality of communication devices to each other, and specifies a communication device existing in the shortest communication path (Step S107).

In the case of NO in Step S106, or after the processing of Step S107, the third specification unit 14 specifies operation status of the specified first physical resource, second physical resource, and communication device (Step S108). For example, the third specification unit 14 specifies a physical resource in which a failure occurs among the specified first physical resource, second physical resource, and communication device.

The output unit 16 outputs information indicating the first physical resource, information indicating the second physical resource, and information indicating the communication device specified by the second specification unit 13 (Step S109). The output unit 16 may also output, in different modes, the information indicating the first physical resource and the information indicating the second physical resource. The output unit 16 may also output the information indicating the first physical resource, the information indicating the second physical resource, and the information indicating the communication device specified by the second specification unit 13 in modes corresponding to the operation status specified by the third specification unit 14. In a case where the path selection unit 15 specifies the communication device existing in the shortest communication path in Step S107, the output unit 16 may also output information indicating the communication device.

By the above processing, the information processing apparatus 1 may notify the administrator of the tenant of the physical resource having a high degree of influence on the operation of the virtual resources without excess or deficiency. Furthermore, by outputting the information indicating the second physical resource specified on the basis of communication connection status, the information processing apparatus 1 may notify the administrator of the tenant of the physical resource that is likely to affect virtual resources in a case where a failure related to communication occurs.

Figure 24:
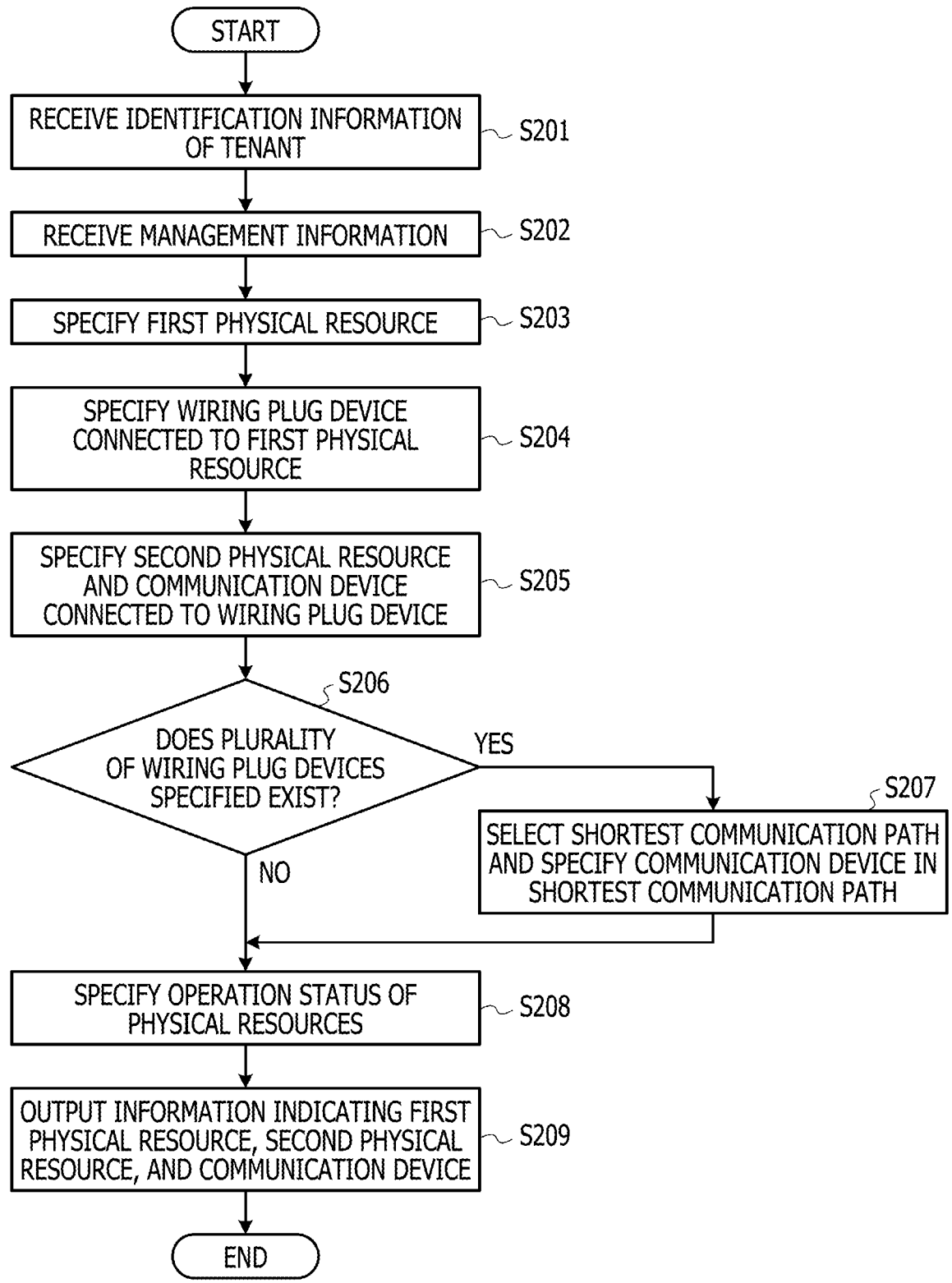
FIG. 24 is a flowchart illustrating a second example of the processing of the first embodiment.

FIG. 24 is a flowchart illustrating a second example of the processing of the embodiment. The second example of the processing of the embodiment is an example in which the second specification unit 13 specifies the wiring plug device as the device. Since Steps S201 to S203 are similar to Steps S101 to S103 in FIG. 23, description thereof will be omitted.

The second specification unit 13 specifies a wiring plug device connected to the first physic& resource specified by the first specification unit 12 (Step S204). The second specification unit 13 specifies one or a plurality of second physical resources which is connected to the wiring plug device and on which virtual resources used by a tenant different from the specified tenant operate, and a communication device connected to the wiring plug device (Step S205). As described above, in a case where physical resources mounted on the same rack are connected to the same wiring plug device, the second specification unit 13 specifies the second physical resource and the communication device that are mounted on the rack on which the first physical resource is mounted.

The path selection unit 15 determines whether a plurality of the wiring plug devices specified by the second specification unit 13 in Step S204 exists (Step S206). In a case where the plurality of wiring plug devices specified by the second specification unit 13 exists (YES in Step S206), the path selection unit 15 selects the shortest communication path among communication paths connecting the plurality of wiring plug devices to each other, and specifies a communication device existing in the shortest communication path (Step S207).

In the case of NO in Step S206, or after the processing of Step S207, the third specification unit 14 specifies operation status of the specified first physical resource, second physical resource, and communication device (Step S208). The third specification unit 14 specifies a physical resource in which a failure occurs among the specified first physical resource, second physical resource, and communication device. The output unit 16 outputs information indicating the first physical resource, information indicating the second physical resource, and information indicating the communication device specified by the second specification unit 13 (Step S209). The output unit 16 may also output, in different modes, the information indicating the first physical resource and the information indicating the second physical resource. The output unit 16 may also output the information indicating the first physical resource, the information indicating the second physical resource, and the information indicating the communication device specified by the second specification unit 13 in modes corresponding to the operation status specified by the third specification unit 14. In a case where the path selection unit 15 specifies the communication device existing in the shortest communication path in Step S207, the output unit 16 may also output information indicating the communication device.

By the above processing, the information processing apparatus 1 may notify the administrator of the tenant of the physical resource having a high degree of influence on the operation of the virtual resources. Furthermore, by outputting the information indicating the second physical resource specified on the basis of connection status of electric wiring, the information processing apparatus 1 may notify the administrator of the tenant of the physical resource that is likely to affect virtual resources in a case where a failure in an electric system occurs.

FIG. 25 is a diagram illustrating an outline of the processing of the embodiment. A system configuration illustrated in an upper part of FIG. 25 is similar to the system configuration illustrated in FIG. 1, and a display example illustrated in a lower part of FIG. 25 is similar to the fourth display example illustrated in FIG. 17. The information processing apparatus 1 performs the processing of the present embodiment on the basis of the system configuration illustrated in the upper part of FIG. 25, and outputs, for example, the display example illustrated in the lower part of FIG. 25. By referring to the display example output by the information processing apparatus 1, the administrator of the tenant may easily specify a cause of the abnormality in the virtual resources as compared with a case of referring to a complicated system configuration diagram.

Second Embodiment

Hereinafter, a second embodiment will be described with reference to the drawings. Note that, in the second embodiment, description of functions and configurations similar to those in the first embodiment will be omitted.

Figure 26:
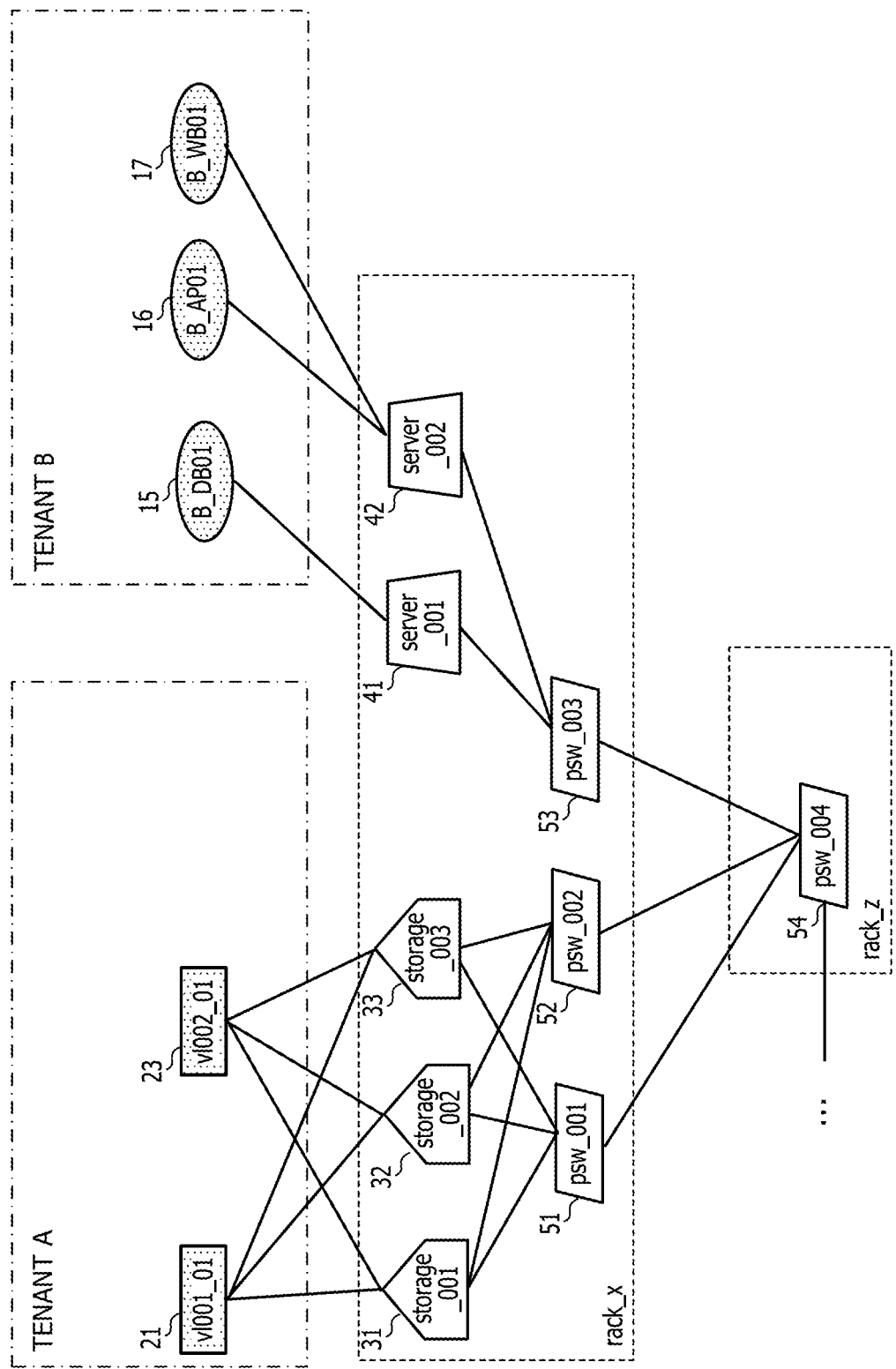
FIG. 26 is a diagram illustrating an example of an overall configuration of a system in a second embodiment.

FIG. 26 is a diagram illustrating an example of an overall configuration of a system in the second embodiment. FIG. 26 includes virtual resources used by a plurality of tenants (tenant A and tenant B) and physical resources on which the virtual resources operate. A notation method in FIG. 26 is similar to that in FIG. 1.

In FIG. 1, vl001_01 (21) and vl002_01 (23) are volumes used by the tenant A. Furthermore, B_DB01 (15), B_AP01 (16), and B_WB01 (17) are virtual machines used by the tenant B.

Furthermore, storage_001 (31), storage_002 (32), and storage_003 (33) are physical storages. server_001 (41) and server_002 (42) are physical servers.

The vl001_01 (21) and the vl002_01 (23) operate on the storage_001 (31), the storage_002 (32), and the storage_003 (33). The B_DB01 (15) operates on the server_001 (41). The B_AP01 (16) and the B_WB01 (17) operate on the server_002 (42).

psw_001 (51), psw_002 (52), psw_003 (53), and psw_004 (54) are physical switches. The storage_001 (31), the storage_002 (32), and the storage_003 (33) are connected to the psw_001 (51) and the psw_002 (52). The server_001 (41) and the server_002 (42) are connected to the psw_003 (53). The psw_001 (51), the psw_002 (52), and the psw_003 (53) are connected to the psw_004 (54).

rack_x and rack_z are racks that mount the physical resources. The rack_x mounts the storage_001 (31), the storage_002 (32), the storage_003 (33), the server_001 (41), and the server_002 (42). The rack_x also mounts the psw_001 (51), the psw_002 (52), and the psw_003 (53). The rack_z mounts the psw_004 (54).

Figure 27:
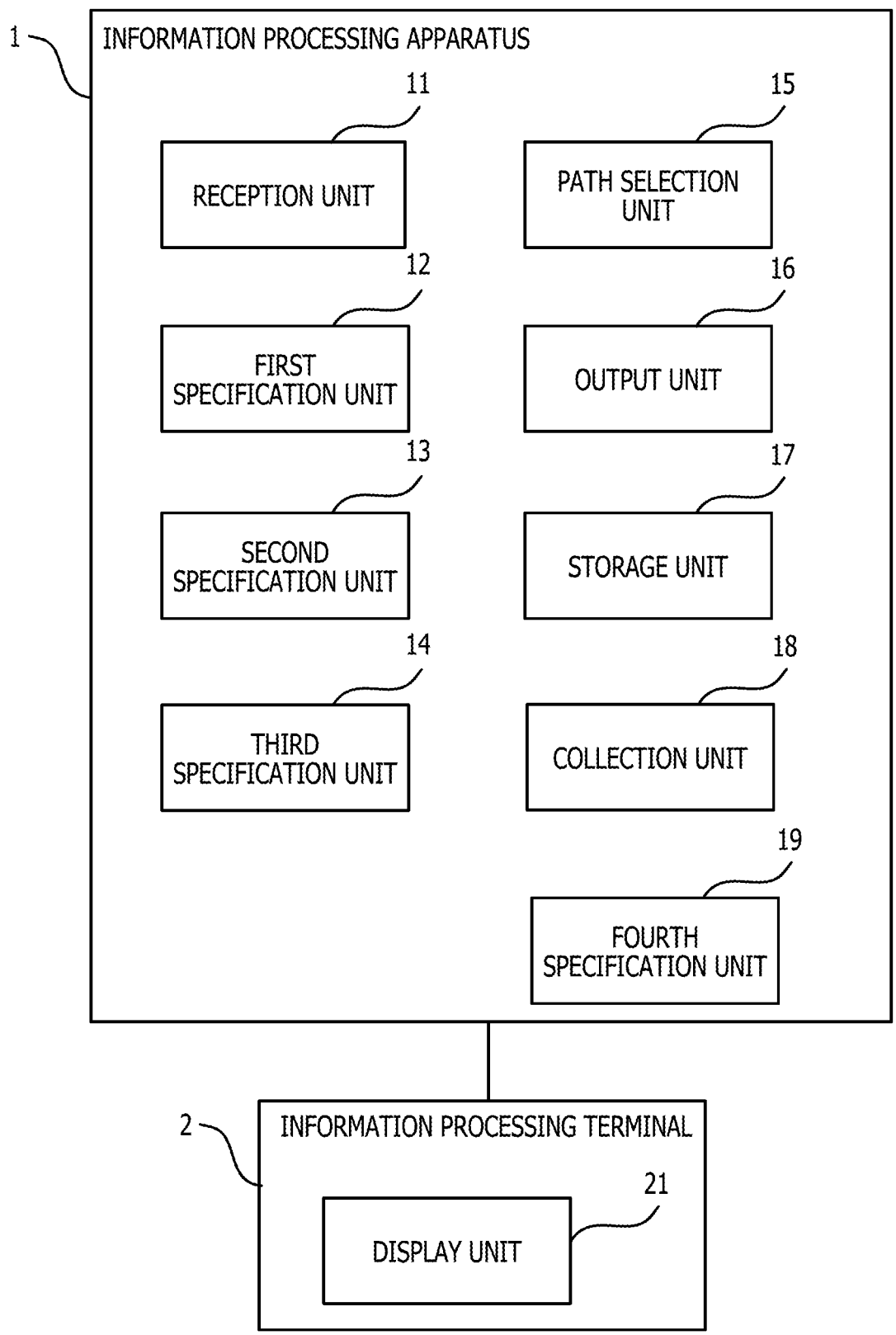
FIG. 27 is a diagram illustrating an example of a functional configuration of an information processing apparatus and an information processing terminal in the second embodiment.

FIG. 27 is a diagram illustrating an example of a functional configuration of an information processing apparatus 1 and an information processing terminal 2 in the second embodiment. At least one of the information processing apparatus 1 and the information processing terminal 2 may also be the virtual machine included in the system of FIG. 26.

The information processing apparatus 1 includes a reception unit 11, a first specification unit 12, a second specification unit 13, a third specification unit 14, a path selection unit 15, an output unit 16, a storage unit 17, a collection unit 18, and a fourth specification unit 19. Since functions of the reception unit 11, the first specification unit 12, the second specification unit 13, the third specification unit 14, the path selection unit 15, and the storage unit 17 are similar to those of the first embodiment, description thereof will be omitted.

The collection unit 18 collects, for each physical resource, physical connection status of the first physical resource specified by the first specification unit 12 or the second physical resource specified by the second specification unit 13, and virtual resource operation status. The collection unit 18 may also collect, for each communication device, physical connection status of the communication device specified by the second specification unit 13.

A fourth specification unit 19 specifies, in a case where virtual resources operating on a plurality of physical resources are the same among the first physical resources or the second physical resources and other physical resources connected to the plurality of physical resources are the same, the plurality of physical resources as redundant physical resources. The fourth specification unit 19 uses the information collected by the collection unit 18 when performing the processing of specifying.

Furthermore, in a case where physical resources connected to a plurality of communication devices are the same among the communication devices (for example, physical switches) connected to the first physical resources specified by the second specification unit 13, the fourth specification unit 19 may also specify the plurality of communication devices as the redundant physical resources.

The output unit 16 may also execute processing described below together with the processing executed by the output unit 16 of the first embodiment.

The output unit 16 outputs, as one node, information indicating the plurality of physical resources (redundant physical resources) specified by the fourth specification unit 19 when outputting the information indicating the first physical resources and the information indicating the second physical resources. Thus, the output unit 16 may make the configuration easy to understand by outputting the plurality of redundant physical resources specified by the fourth specification unit 19 as one node.

The output unit 16 may also display an icon indicating presence or absence of a failure in each physical resource in the node indicating the plurality of redundant physical resources. For example, the output unit 16 may also display, in different modes, an icon corresponding to a physical resource in which a failure occurs and an icon corresponding to a physical resource in which a failure does not occur.

The output unit 16 may also display, as one node, the information indicating the plurality of physical resources specified by the fourth specification unit 19 on a display device, or may also output an instruction to display the information as one node to the information processing terminal 2. This instruction may also include the presence or absence of the display of the icon, the display mode, and the like described above. The display device may be mounted on the information processing apparatus 1 or may also be connected to the information processing apparatus 1.

The information processing terminal 2 is connected to the information processing apparatus 1. A display unit 21 of the information processing terminal 2 performs display based on the information output from the output unit 16. The information processing terminal 2 displays, for example, the information indicating the plurality of physical resources specified by the fourth specification unit 19 as one node on the basis of the instruction from the output unit 16.

Hereinafter, an example of each piece of information included in management information stored in the storage unit 17 in the second embodiment will be described. Note that, in the management information, illustration of information indicating a relationship between the tenant and the virtual machine, information indicating a relationship between the tenant and the volume, information indicating a relationship between the physical server and the rack, information indicating a relationship between the physical storage and the rack, and information indicating a relationship between the physical switch and the rack are omitted.

FIG. 28 is a diagram illustrating an example of information indicating a relationship between the virtual machine and the physical server in the second embodiment. In the example illustrated in FIG. 28, identification information of the virtual machine and identification information of the physical server on which the virtual machine operates are associated with each other.

FIG. 29 is a diagram illustrating an example of information indicating a relationship between the volume and the physical storage in the second embodiment. In the example illustrated in FIG. 29, identification information of the volume and identification information of the physical storage on which the volume operates are associated with each other.

FIG. 30 is a diagram illustrating an example of information indicating a relationship between the physical server and the physical switch in the second embodiment. In the example illustrated in FIG. 30, the identification information of the physical server and identification information of the physical switch connected to the physical server are associated with each other.

FIG. 31 is a diagram illustrating an example of information indicating a relationship between the physical storage and the physical switch in the second embodiment. In the example illustrated in FIG. 31, the identification information of the physical storage and the identification information of the physical switch connected to the physical storage are associated with each other.

FIG. 32 is a diagram illustrating an example of information indicating a connection relationship between the physical switches in the second embodiment. In the example illustrated in FIG. 32, the identification information of the physical switch and the identification information of the physical switch connected to the physical switch are associated with each other.

FIG. 33 is a diagram illustrating an example of information indicating presence or absence of a failure in the physical resources in the second embodiment. In the example illustrated in FIG. 33, the identification information of the physical resources (physical servers, physical storages, and physical switches) is associated with presence or absence of a failure in the physical resources. The information indicated in FIG. 33 may also include, for example, content of a failure and the like. The third specification unit 14 may specify, on the basis of the information indicated in FIG. 33, a physical resource in which a failure occurs among the first physical resources, the second physical resources, and the communication device.

FIG. 34 is a diagram illustrating an example of collection information of the physical storage in the second embodiment. The collection information indicated in FIG. 34 is information obtained by the collection unit 18 collecting, for each physical resource (physical storage), physical connection status of the first physical resources or the second physical resources, and virtual resource operation status.

As illustrated in FIG. 34, the storage_001, the storage_002, and the storage_003 have the same physical connection status of the physical resources and the same virtual resource operation status. For example, virtual resources operating on the storage_001, the storage_002, and the storage_003 are the same, and other physical resources connected to the storage_001, the storage_002, and the storage_003 are the same. Thus, the fourth specification unit 19 specifies the storage_001, the storage_002, and the storage_003 as redundant physical resources.

FIG. 35 is a diagram illustrating an example of collection information of the physical switch in the second embodiment. The collection information indicated in FIG. 35 is information obtained by the collection unit 18 collecting, for each physical switch, physical connection status of the physical switch.

As illustrated in FIG. 35, the psw_001 and the psw_002 have the same physical connection status of the physical resources. For example, other physical resources connected to the psw_001 and the psw_002 are the same. Thus, the fourth specification unit 19 specifies the psw_001 and the psw_002 as the redundant physical resources.

Figure 36:
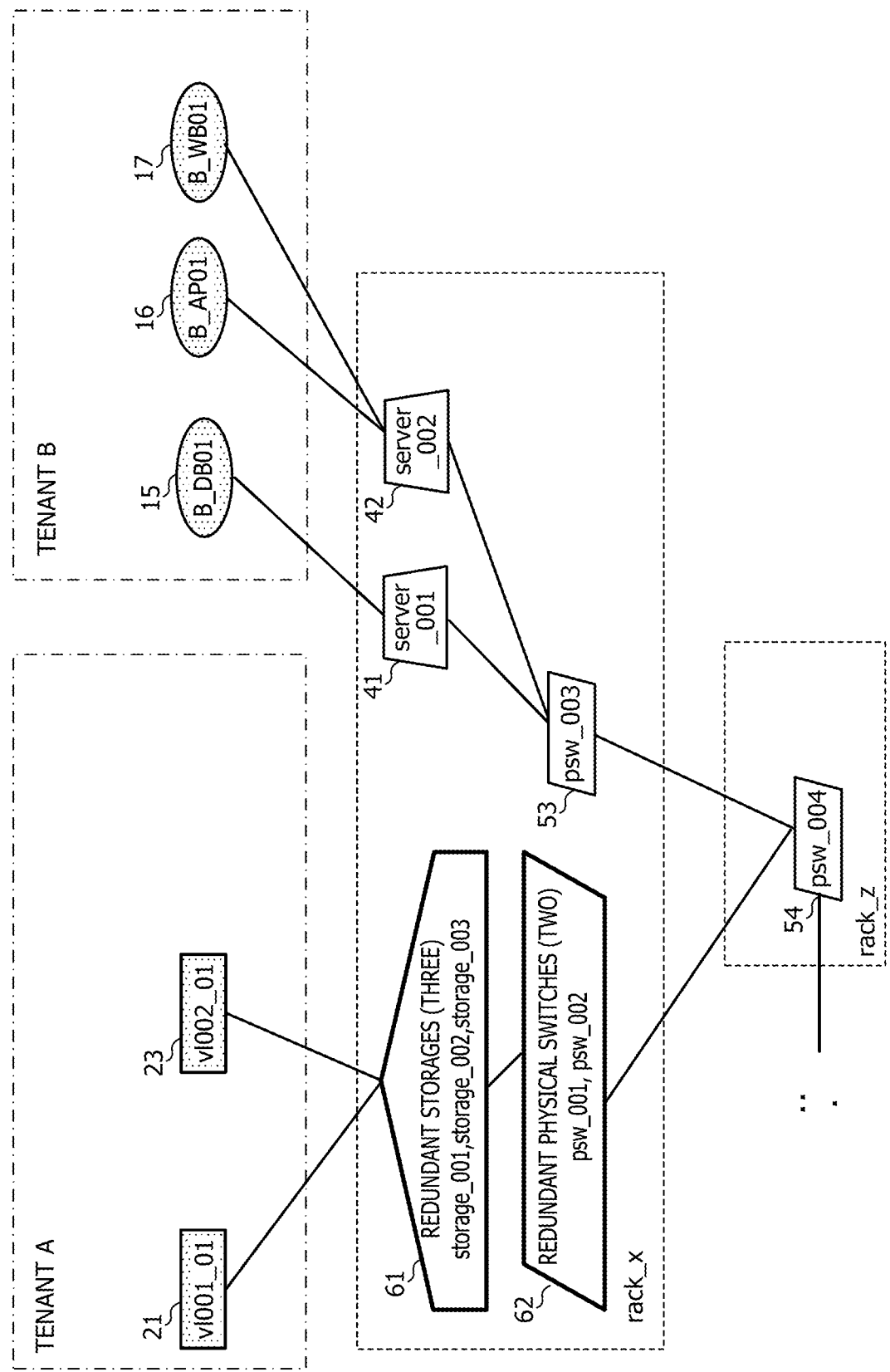
FIG. 36 is a diagram illustrating a tenth display example of the system configuration.

FIG. 36 is a diagram illustrating a tenth display example of the system configuration. As described above, the output unit 16 outputs, as one node, the plurality of physical resources (redundant physical resources) specified by the fourth specification unit 19 when outputting the information indicating the first physical resources and the information indicating the second physical resources. For example, since the storage_001, the storage_002, and the storage_003 are specified as the redundant physical resources, the output unit 16 outputs the storage_001, the storage_002, and the storage_003 as one node (redundant storages 61). Furthermore, since the psw_001 and the psw_002 are specified as the redundant physical resources, the output unit 16 outputs the psw_001 and the psw_002 as one node (redundant physical switches 62). For example, the output unit 16 collectively displays the plurality of physical resources specified by the fourth specification unit 19 as one physical resource.

For example, in a case where a connection configuration of the system is complicated, it may be difficult for a user to understand a connection relationship of each physical resource. However, the information processing apparatus 1 of the present embodiment may make the configuration easy to understand by collectively outputting the plurality of physical resources as one node.

Figure 37:
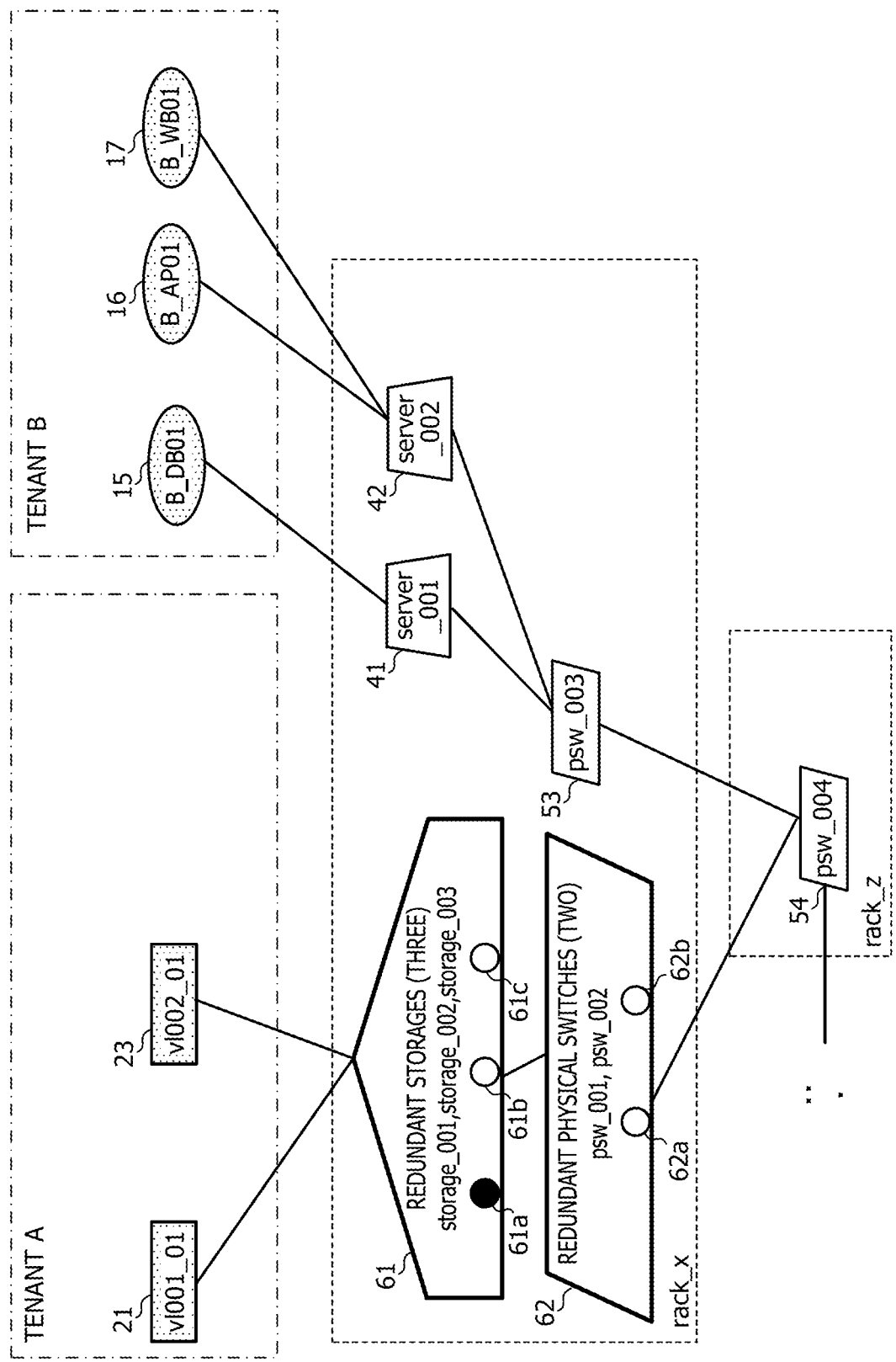
FIG. 37 is a diagram illustrating an eleventh display example of the system configuration.

FIG. 37 is a diagram illustrating an eleventh display example of the system configuration. In the example illustrated in FIG. 37, similarly to the example illustrated in FIG. 36, the redundant storages 61 and the redundant physical switches 62 in which the plurality of physical resources is collected are illustrated. In the example illustrated in FIG. 37, icons 61a to 61c indicating operation status of the respective physical resources (the storage_001, the storage_002, and the storage_003) are indicated in the redundant storages 61. Similarly, icons 62a and 62b indicating operation status of the respective physical resources (the psw_001 and the psw_002) are indicated in the redundant physical switches 62.

In the example illustrated in FIG. 37, the icon 61a corresponding to the storage_001 in which a failure occurs is displayed in a different mode from the other icons 61b and 61c in the redundant storages 61. In this way, the output unit 16 displays the icon indicating presence or absence of a failure in each physical resource in the node that collects the plurality of redundant physical resources, and displays, in different modes, the icon corresponding to the physical resource in which a failure occurs and the icons corresponding to the physical resources in which a failure does not occur. With this configuration, a user may know presence or absence of a failure in each physical resource.

Figure 38:
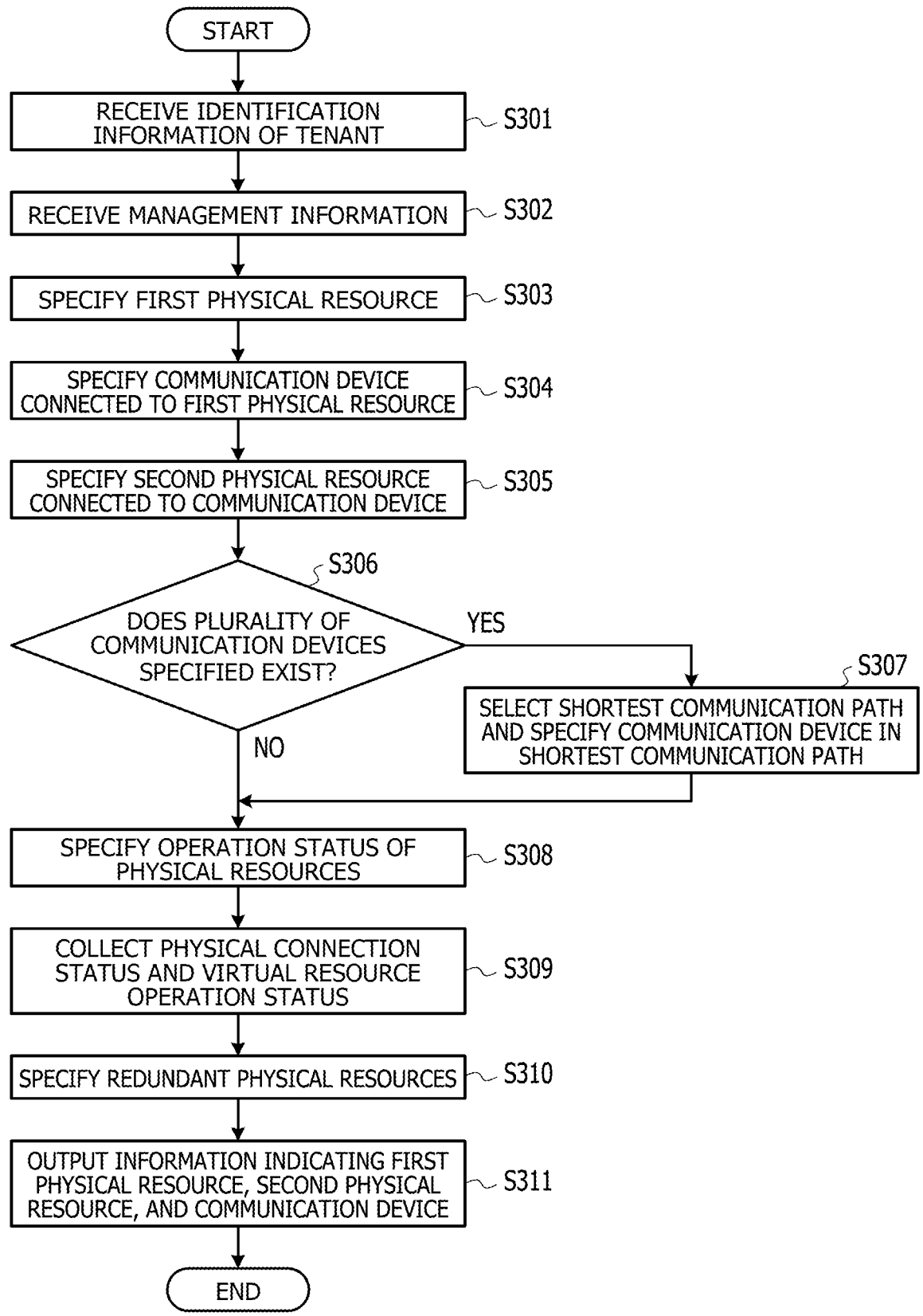
FIG. 38 is a flowchart illustrating a first example of processing of the second embodiment.

FIG. 38 is a flowchart illustrating a first example of processing of the second embodiment. The first example is an example in which the second specification unit 13 specifies the communication device as the device. In FIG. 38, since Steps S301 to S308 are similar to Steps S101 to S108 in the flowchart of the first embodiment illustrated in FIG. 23, description thereof will be omitted.

The collection unit 18 collects, for each physical resource, physical connection status of the first physical resource specified in Step S303 by the first specification unit 12 or the second physical resource specified in Step S305 by the second specification unit 13, and virtual resource operation status (Step S309). The information obtained in the processing of Step S309 is, for example, the information indicated in FIG. 34. Moreover, the collection unit 18 may also collect, for each communication device, physical connection status (for example, FIG. 35) of the communication device specified in Step S304 by the second specification unit 13.

The fourth specification unit 19 specifies, in a case where virtual resources operating on a plurality of physical resources are the same among the first physical resources or the second physical resources and other physical resources connected to the plurality of physical resources are the same, the plurality of physical resources as redundant physical resources (Step S310). Moreover, in a case where physical resources connected to a plurality of communication devices are the same among the communication devices (for example, physical switches) connected to the first physical resources specified in Step S304 by the second specification unit 13, the fourth specification unit 19 may also specify the plurality of communication devices as the redundant physical resources. The fourth specification unit 19 uses the information collected by the collection unit 18 when performing the processing of specifying.

The output unit 16 outputs, as one node, information indicating the plurality of physical resources (redundant physical resources) specified by the fourth specification unit 19 when outputting the information indicating the first physical resource, the information indicating the second physical resource, and the information indicating the communication device specified by the second specification unit 13 (Step S311).

Figure 39:
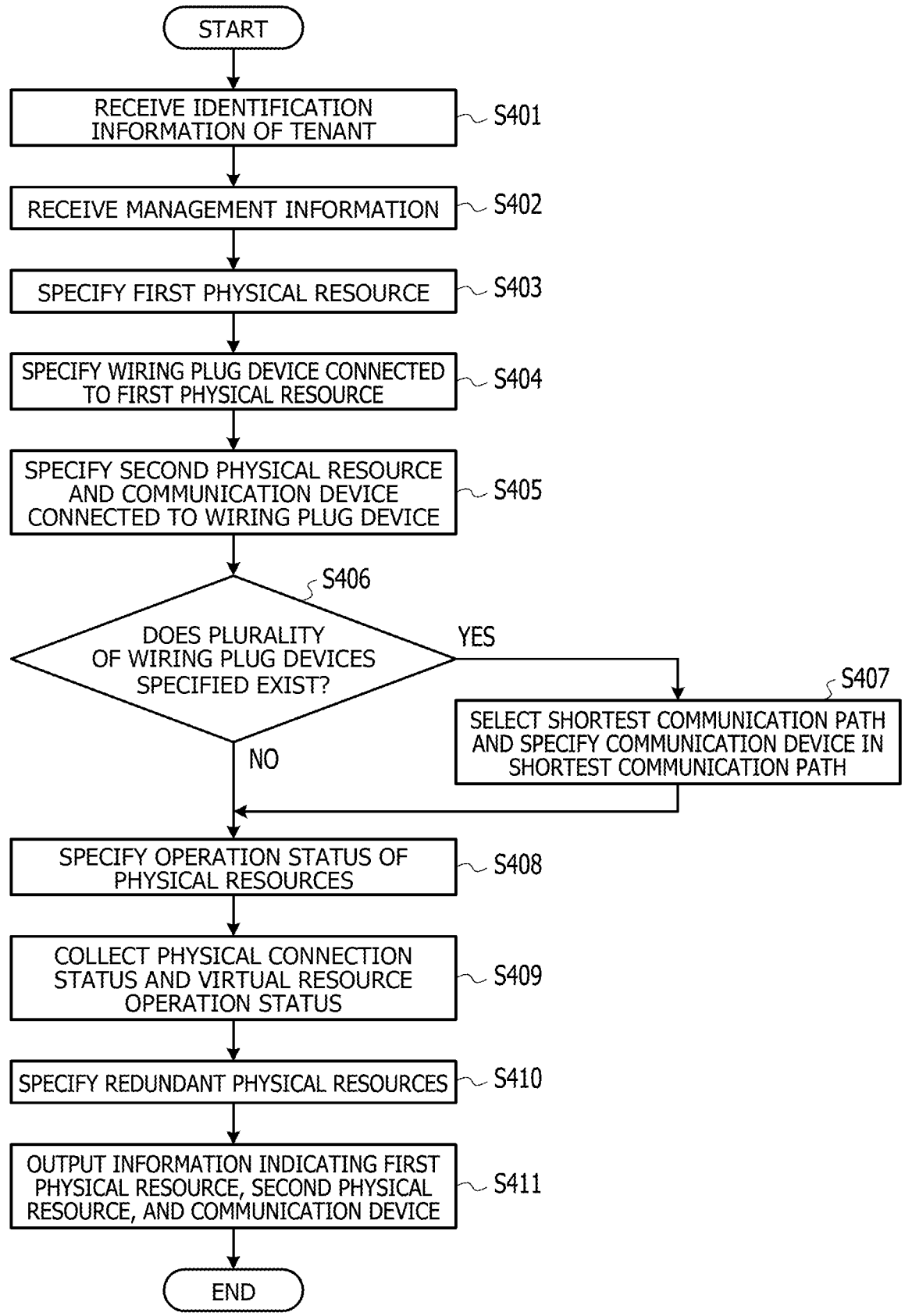
FIG. 39 is a flowchart illustrating a second example of the processing of the second embodiment.

FIG. 39 is a flowchart illustrating a second example of the processing of the second embodiment. The second example is an example in which the second specification unit 13 specifies a wiring plug device as the device. In FIG. 39, since Steps S401 to S408 are similar to Steps S201 to S208 in the flowchart of the second example of the first embodiment illustrated in FIG. 24, description thereof will be omitted.

Furthermore, processing of Steps S409 to S411 is similar to the processing of Steps S309 to S311 in FIG. 38. Note that the second example is different from the first example in that the fourth specification unit 19 does not specify the plurality of communication devices.

<Hardware Configuration>

Next, an example of a hardware configuration of the information processing apparatus 1 of the first embodiment and the second embodiment will be described. FIG. 40 is a diagram illustrating an example of the hardware configuration of the information processing apparatus 1. As illustrated in the example of FIG. 40, in the information processing apparatus 1, a processor 111, a memory 112, an auxiliary storage device 113, a communication interface 114, a medium connection unit 115, an input device 116, and an output device 117 are connected to a bus 100.

The processor 111 executes a program developed in the memory 112. As the program to be executed, an information processing program that performs the processing in the embodiments may also be applied.

The memory 112 is, for example, a random access memory (RAM). The auxiliary storage device 113 is a storage device that stores various types of information, and for example, a hard disk drive, a semiconductor memory, or the like may also be applied to the auxiliary storage device 113. The information processing program that performs the processing in the embodiments may also be stored in the auxiliary storage device 113.

The communication interface 114 is connected to a communication network such as a local area network (LAN) and a wide area network (WAN), and performs data conversion or the like pertaining to communication. The reception unit 11 illustrated in FIGS. 4 and 27 may also receive each piece of information via, for example, the communication interface 114. The output unit 16 illustrated in FIGS. 4 and 27 may also output each piece of information to another information processing terminal or the like via, for example, the communication interface 114.

The medium connection unit 115 is an interface to which a portable recording medium 118 may be connected. As the portable recording medium 118, an optical disc (for example, a compact disc (CD), a digital versatile disc (DVD), or the like), a semiconductor memory, or the like may also be applied. The information processing program that performs the processing in the embodiments may also be recorded in the portable recording medium 118.

The input device 116 is, for example, a keyboard, a pointing device, or the like, and receives an instruction, information, or the like input from a user.

The output device 117 is, for example, a display device, a printer, a speaker, or the like, and outputs an inquiry or instruction to a user, a processing result, and the like. The output unit 16 illustrated in FIGS. 4 and 27 may also output each piece of information by using, for example, the output device 117.

The storage unit 17 illustrated in FIGS. 4 and 27 may also be implemented by the memory 112, the auxiliary storage device 113, the portable recording medium 118, or the like. The first specification unit 12, the second specification unit 13, the third specification unit 14, and the path selection unit 15 illustrated in FIG. 4 may also be implemented by the processor 111 executing the information processing program developed in the memory 112.

The memory 112, the auxiliary storage device 113, and the portable recording medium 118 are computer-readable, non-transitory tangible storage media, not transitory media such as signal carriers.

Note that the information processing apparatus 1 does not have to include all the components illustrated in FIG. 40, and some components may also be omitted. Furthermore, some components may exist in an external device of the information processing apparatus 1, and the information processing apparatus 1 may also be connected to the external device to use the components in the external device. Furthermore, it is assumed that a hardware configuration of the information processing terminal 2 is similar to the configuration illustrated in FIG. 40.

The present embodiments are not limited to the embodiments described above, and various changes, additions, and omissions may be applied without departing from the scope of the present embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing method executed by a computer, the information processing method comprising:
specifying one or a plurality of first physical resources on which virtual resources used by a first user operate;
specifying a communication device connected to the first physical resource, and specifying one or a plurality of second physical resources different from the first physical resource, which is connected to the communication device and on which virtual resources used by a user other than the first user operate;
selecting, in a case where a plurality of the communication devices exists, a shortest communication path among communication paths that connect the plurality of communication devices to each other, and specifying the communication device that exists in the shortest communication path;
specifying another communication device connected to a wiring plug device to which the communication device that exists in the shortest communication path is connected;
outputting information that indicates the first physical resource information that indicates the second physical resource, and information that indicates the communication device that exists in the shortest communication path; and
outputting, in another case where the another communication device is not connected to the first physical resource, the information that indicates the communication device that exists in the shortest communication path and information that indicates the another communication device, in different modes.

2. The information processing method according to claim 1, further comprising:
specifying operation status of the first physical resource and the second physical resource; and
outputting, in modes that correspond to the operation status, the information that indicates the first physical resource and the information that indicates the second physical resource.

3. The information processing method according to claim 1, further comprising
outputting, in the different modes, the information that indicates the first physical resource and the information that indicates the second physical resource.

4. The information processing method according to claim 1, further comprising:

specifying, as the device, a wiring plug device connected to the first physical resource, and specifying one or a plurality of the second physical resources which is connected to the wiring plug device and on which virtual resources used by a user different from the first user operate, and a communication device connected to the wiring plug device; and outputting the information that indicates the first physical resource, the information that indicates the second physical resource, and information that indicates the communication device connected to the wiring plug device.

5. The information processing method according to claim 4, further comprising outputting, in the different modes, information that indicates a communication device connected to the first physical resource and information that indicates a communication device that is connected to the wiring plug device and is not connected to the first physical resource.

6. The information processing method according to claim 1, wherein the device is a communication device of a layer 2 or higher, and when one or a plurality of the second physical resources is specified, a physical resource connected to the device via another communication device of a layer 2 or higher is not specified as one or a plurality of the second physical resources.

7. The information processing method according to claim 1, wherein in yet another case where the virtual resources that operate on a plurality of physical resources are the same among the first physical resources or the second physical resources, and other physical resources connected to the plurality of physical resources are the same, the plurality of physical resources is specified, and information that indicates the plurality of physical resources is output as one node.

8. A non-transitory computer-readable recording medium storing an information processing program causing a computer to execute a processing of:

specifying one or a plurality of first physical resources on which virtual resources used by a first user operate;

specifying a communication device connected to the first physical resource, and specifying one or a plurality of second physical resources different from the first physical resource, which is connected to the communication device and on which virtual resources used by a user other than the first user operate;

selecting, in a case where a plurality of the communication devices exists, a shortest communication path among communication paths that connect the plurality of communication devices to each other, and specifying the communication device that exists in the shortest communication path;

specifying another communication device connected to a wiring plug device to which the communication device that exists in the shortest communication path is connected;

outputting information that indicates the first physical resource, information that indicates the second physical resource, and information that indicates the communication device that exists in the shortest communication path; and outputting, in another case where the another communication device is not connected to the first physical resource, the information that indicates the communication device that exists in the shortest communication path and information that indicates the another communication device, in different modes.

9. An information processing apparatus comprising:

a memory; and a processor coupled to the memory and configured to:

specify one or a plurality of first physical resources on which virtual resources used by a first user operate;

specify a communication device connected to the first physical resource and specifying one or a plurality of second physical resources different from the first physical resource, which is connected to the communication device and on which virtual resources used by a user other than the first user operate;

select, in a case where a plurality of the communication devices exists, a shortest communication path among communication paths that connect the plurality of communication devices to each other, and specifying the communication device that exists in the shortest communication path;

specify another communication device connected to a wiring plug device to which the communication device that exists in the shortest communication path is connected;

output information that indicates the first physical resource information that indicates the second physical resource, and information that indicates the communication device that exists in the shortest communication path; and output, in another case where the another communication device is not connected to the first physical resource, the information that indicates the communication device that exists in the shortest communication path and information that indicates the another communication device, in different modes.

* * * * *